(12) United States Patent
Nadakuduti et al.

(10) Patent No.: US 12,323,961 B2
(45) Date of Patent: Jun. 3, 2025

(54) ALLOCATION OF TRANSMIT POWER IN COMPLIANCE WITH RF EXPOSURE REQUIREMENTS

(71) Applicant: QUALCOMM Incorporated, San Diego, CA (US)

(72) Inventors: Jagadish Nadakuduti, Mission Viejo, CA (US); Lin Lu, San Diego, CA (US); Raghu Narayan Challa, San Diego, CA (US); Brian Clarke Banister, San Diego, CA (US); Tienyow Liu, Santa Clara, CA (US); Jing Lin, Milpitas, CA (US); Ramesh Chandra Chirala, San Diego, CA (US); Bhupesh Manoharlal Umatt, Poway, CA (US); Sachin Jain, Santa Clara, CA (US); Troy Curtiss, Boulder, CO (US); Akhil Deodhar, Louisville, CO (US); Michel Chauvin, San Diego, CA (US); Farhad Meshkati, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/450,262

(22) Filed: Oct. 7, 2021

(65) Prior Publication Data

US 2022/0116949 A1     Apr. 14, 2022

Related U.S. Application Data

(60) Provisional application No. 63/110,552, filed on Nov. 6, 2020, provisional application No. 63/108,315, filed
(Continued)

(51) Int. Cl.
*H04W 72/044*     (2023.01)
*H04W 52/36*      (2009.01)
*H04W 72/56*      (2023.01)

(52) U.S. Cl.
CPC ....... *H04W 72/0473* (2013.01); *H04W 72/56* (2023.01)

(58) Field of Classification Search
CPC .... H04B 7/024; H04B 7/0452; H04B 7/0491; H04B 10/293; H04B 10/564
See application file for complete search history.

(56) References Cited

U.S. PATENT DOCUMENTS 7,120,134 B2    10/2006  Tiedemann et al.
10,447,413 B1 *  10/2019  Nadakuduti .......... H04B 17/18
(Continued)

FOREIGN PATENT DOCUMENTS

EP     3567940 A1    11/2019
TW    201828746 A    8/2018
WO    2020010232     1/2020

OTHER PUBLICATIONS

International Search Report and Written Opinion—PCT/US2021/071784—ISA/EPO—Feb. 7, 2022.
Taiwan Search Report—TW110137603—TIPO—Feb. 19, 2025.

*Primary Examiner* — San Htun
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may allocate a first amount of power to one or more radios for a time window based on radio frequency (RF) exposure information and one or more other criteria. The UE may allocate a second amount of power to a selected channel or communication utilized by at least one radio of the one or more radios for one or more time frames within the time
(Continued)

window based on the first amount of power allocated to the at least one radio for the time window. The UE may transmit the selected channel or communication based on the first amount of power or the second amount of power. Numerous other aspects are described.

30 Claims, 10 Drawing Sheets

Related U.S. Application Data on Oct. 31, 2020, provisional application No. 63/198,300, filed on Oct. 8, 2020.

(56) References Cited

U.S. PATENT DOCUMENTS

| | | | |
|---|---|---|---|
| 2012/0021707 A1* | 1/2012 | Forrester | H04W 52/30 455/115.3 |
| 2012/0021800 A1* | 1/2012 | Wilson | H04W 72/02 455/127.1 |
| 2012/0142291 A1* | 6/2012 | Rath | H04B 7/0613 455/127.1 |
| 2013/0045700 A1* | 2/2013 | Stallman | H04B 1/3838 455/129 |
| 2013/0107868 A1* | 5/2013 | Sadek | H04W 52/325 370/338 |
| 2014/0164504 A1 | 6/2014 | Dellenbach et al. | |
| 2017/0064641 A1* | 3/2017 | Logan | H04W 52/367 |
| 2017/0265148 A1 | 9/2017 | Balasubramanian et al. | |
| 2017/0332333 A1* | 11/2017 | Santhanam | H04W 52/365 |
| 2018/0048054 A1* | 2/2018 | Song | H01Q 1/245 |
| 2018/0316379 A1* | 11/2018 | Chang | H01Q 1/245 |
| 2019/0215783 A1* | 7/2019 | Chakraborty | H04W 52/146 |
| 2019/0349017 A1* | 11/2019 | Kaidar | H04W 52/367 |
| 2020/0015171 A1* | 1/2020 | Nadakuduti | H04W 52/12 |
| 2020/0374882 A1 | 11/2020 | Cai et al. | |
| 2020/0383068 A1* | 12/2020 | Yang | H04W 52/367 |

\* cited by examiner

ALLOCATION OF TRANSMIT POWER IN COMPLIANCE WITH RF EXPOSURE REQUIREMENTS

CROSS-REFERENCE TO RELATED APPLICATIONS

This Patent Application claims priority to U.S. Provisional Patent Application No. 63/198,300, filed on Oct. 8, 2020, and entitled "CHANNEL PRIORITIZATION FOR TIME-AVERAGED POWER LIMIT MANAGEMENT;" U.S. Provisional Patent Application No. 63/108,315, filed on Oct. 31, 2020, and entitled "ALLOCATION OF TRANSMIT POWER IN COMPLIANCE WITH RF EXPOSURE REQUIREMENTS;" and U.S. Provisional Patent Application No. 63/110,552, filed on Nov. 6, 2020, and entitled "ALLOCATION OF TRANSMIT POWER IN COMPLIANCE WITH RF EXPOSURE REQUIREMENTS." The disclosure of the prior Applications is considered part of and is incorporated by reference into this Patent Application.

BACKGROUND

Wireless communication systems are widely deployed to provide various telecommunication services such as telephony, video, data, messaging, broadcasts, etc. Modern wireless communication devices (such as cellular telephones) are generally required to meet radio frequency (RF) exposure limits set by domestic and international standards and regulations. To ensure compliance with the standards, such devices must currently undergo an extensive certification process prior to being shipped to market.

SUMMARY

Some aspects described herein relate to a method of wireless communication performed by a wireless device. The method may include allocating a first amount of power to one or more radios of the wireless device for a time window based on radio frequency (RF) exposure information and one or more other criteria. The method may include allocating a second amount of power to a selected channel or communication utilized by at least one radio of the one or more radios for one or more time frames within the time window based on the first amount of power allocated to the at least one radio for the time window. The method may include transmitting the selected channel or communication based on the first amount of power or the second amount of power.

Some aspects described herein relate to a user equipment (UE) for wireless communication. The user equipment may include a memory and one or more processors coupled to the memory. The one or more processors may be configured to allocate a first amount of power to one or more radios for a time window based on RF exposure information and one or more other criteria. The one or more processors may be configured to allocate a second amount of transmit power to a selected channel or communication utilized by at least one of the one or more radios for one or more time frames within the time window based on the power allocated to the at least one radio for the time window.

Some aspects described herein relate to a non-transitory computer-readable medium that stores one or more instructions for wireless communication by a user equipment. The one or more instructions, when executed by one or more processors of the user equipment, may cause the user equipment to allocate a first amount of power to one or more radios of the user equipment for a time window based on RF exposure information and one or more other criteria. The one or more instructions, when executed by one or more processors of the user equipment, may cause the user equipment to allocate a second amount of transmit power to a selected channel or communication utilized by at least one of the one or more radios for one or more time frames within the time window based on the power allocated to the at least one radio for the time window.

Some aspects described herein relate to an apparatus for wireless communication. The apparatus may include means for allocating a first amount of power to one or more radios of a device including the apparatus for a time window based on RF exposure information and one or more other criteria. The apparatus may include means for allocating a second amount of transmit power to a selected channel or communication utilized by at least one of the one or more radios for one or more time frames within the time window based on the power allocated to the at least one radio for the time window.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

Certain aspects of this disclosure are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
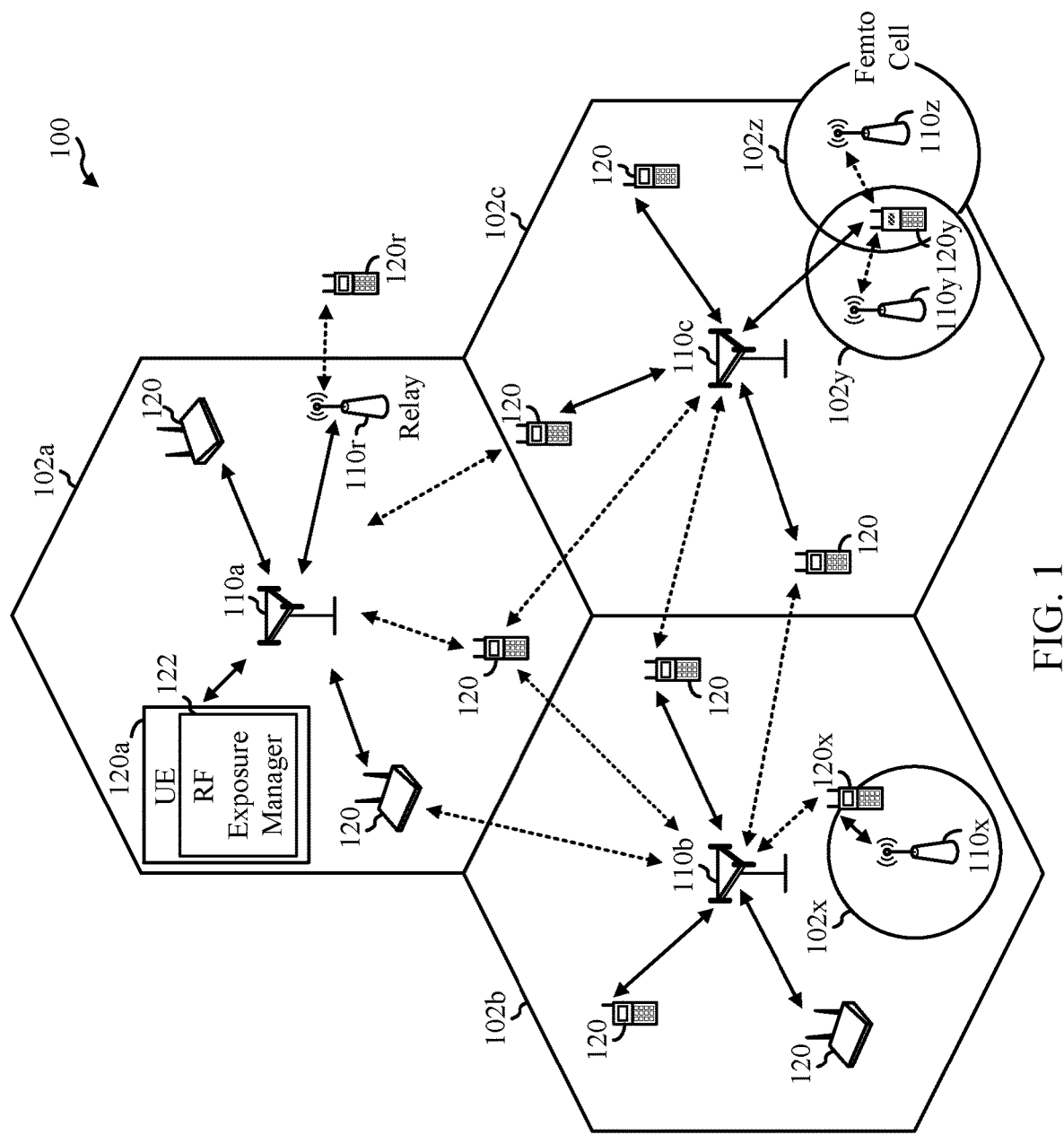
FIG. 1 is a block diagram illustrating an example wireless communication network, in accordance with the present disclosure.
Figure 1:
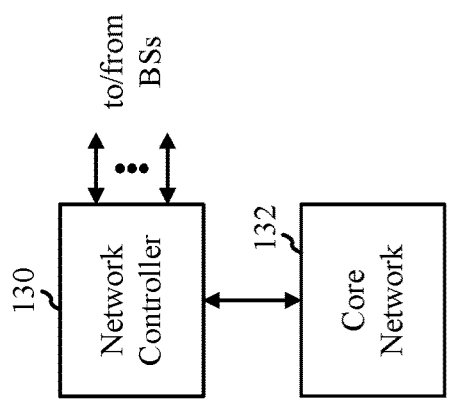

Aspects of the present disclosure provide apparatus, methods, processing systems, and computer-readable mediums for complying with radio frequency (RF) exposure. Transmit power may be allocated among one or more channels across one or more radios in a device in compliance with RF exposure requirements, for example according to a time-averaged RF exposure requirement. In certain cases, antennas may be grouped, for example, using backoff factors to determine the antenna grouping. In aspects, the antenna groups may be defined and/or operated so as to be mutually exclusive in terms of RF exposure. In such embodiments, the RF exposure compliance and corresponding transmit power levels may be determined separately for each antenna group. Transmit power may be allocated so as to maintain a link, maintain a quality of service, or according to one or more other criteria. The allocation may be performed for each antenna group and/or for each radio in a device. In some such aspects, transmit power is allocated so as to maintain essential operations on a channel or set of channels while allowing for increased opportunity for the device to transmit uplink data.

The following description provides examples of RF exposure compliance in communication systems, and is not limiting of the scope, applicability, or examples set forth herein. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and/or radio technologies. While aspects may be described herein using terminology commonly associated with 3G, 4G, and/or new radio (e.g., 5G New Radio (NR)) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications machine-type communication (MTC) (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. Multiple-input multiple-output (MIMO) transmissions with precoding may also be supported, as may multi-layer transmissions. Aggregation of multiple cells may be supported.

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that groups antennas for RF exposure compliance and/or enforces RF composure compliance per antenna group, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Devices of the wireless network may communicate using the electromagnetic spectrum, which may be subdivided by frequency or wavelength into various classes, bands, channels, or the like. For example, devices of the wireless communication network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Figure 2:
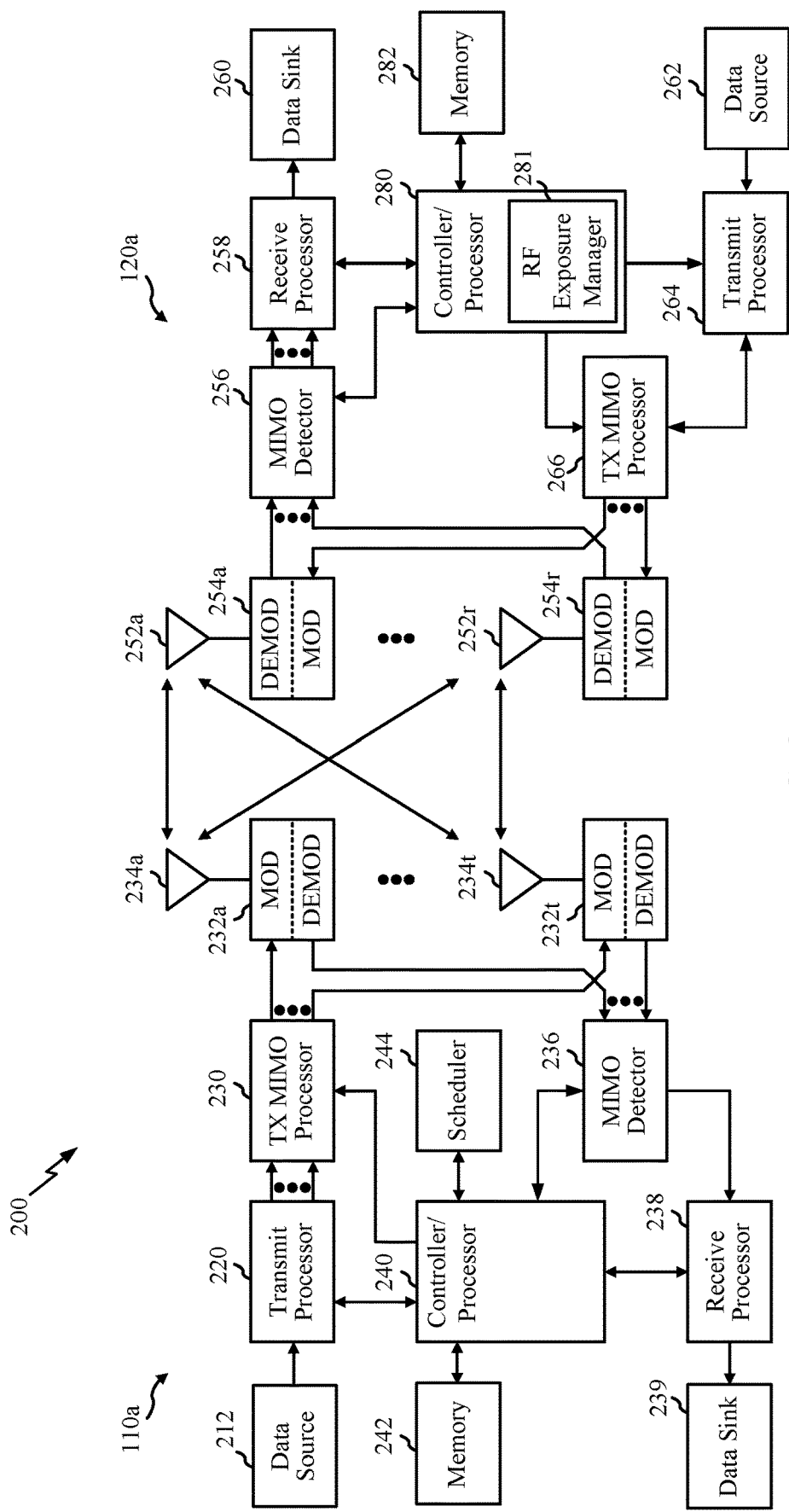
FIG. 2 is a block diagram illustrating a design of an example a base station (BS) and user equipment (UE), in accordance with the present disclosure.

FIG. 2 illustrates an example 200 of components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information (CSI) reference signal (CSI-RS). A transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink signal. Downlink signals from modulators transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the PUSCH) from a data source 262 and control information (e.g., for the physical uplink control channel (PUCCH) from the controller/processor 280). The transmit processor 264 may also generate reference symbols for a reference signal (e.g., for a sounding reference signal (SRS)). The symbols from the transmit processor 264 may be precoded by a TX MIMO processor 266 if applicable, further processed by the MODs in transceivers 254a-254r (e.g., for single-carrier frequency division multiplexing (SC-FDM), etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that groups antennas for RF exposure compliance and/or enforces RF composure compliance per antenna group, according to aspects described herein. Although shown at the controller/processor, other components of the UE 120a and BS 110a may be used to perform the operations described herein.

NR may utilize OFDM with a cyclic prefix (CP) on the uplink and downlink. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

Example RF Transceiver

Figure 3:
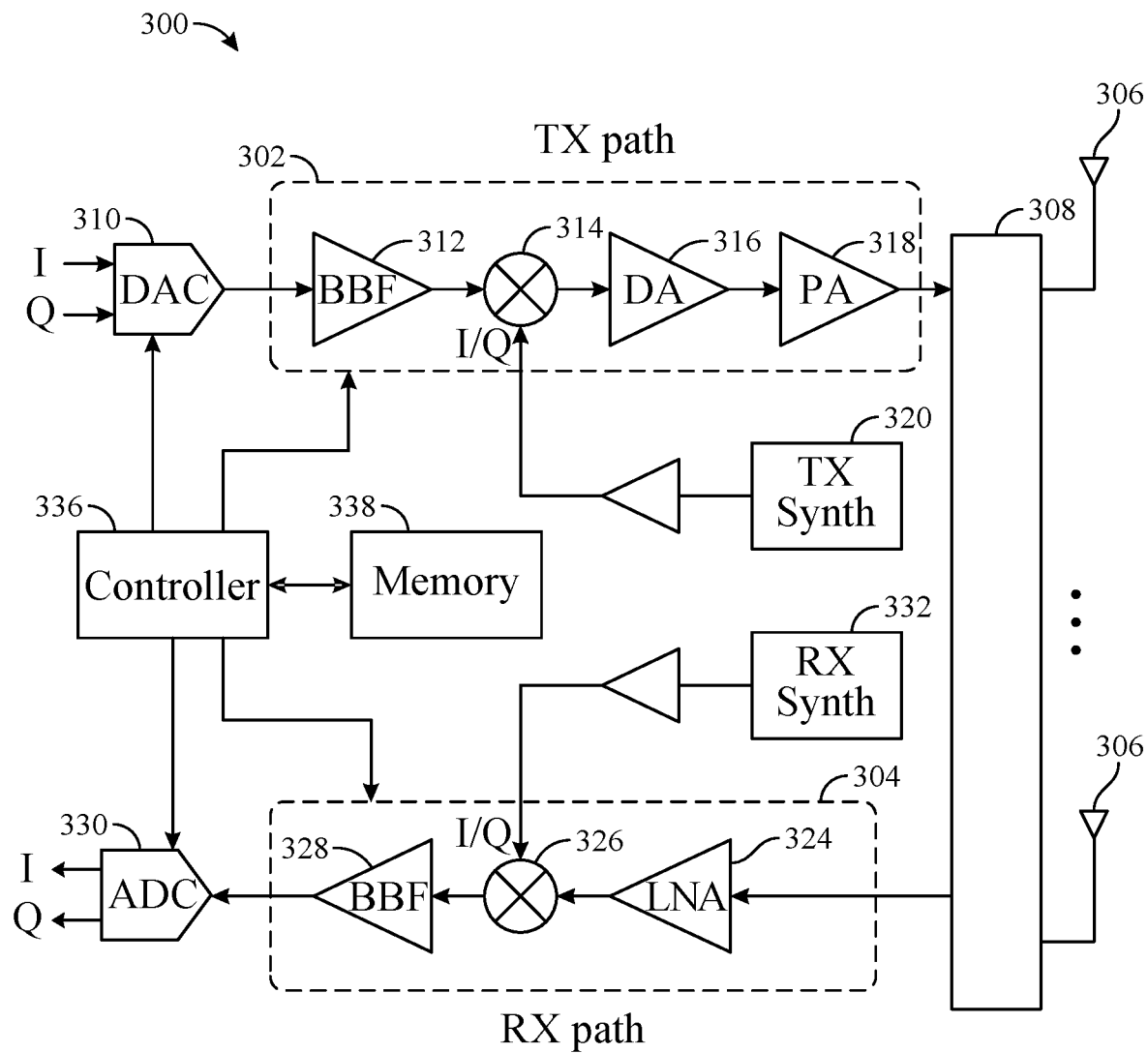
FIG. 3 is a block diagram of an example radio frequency (RF) transceiver, in accordance with the present disclosure.

FIG. 3 is a block diagram of an example RF transceiver circuit 300, in accordance with the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations. TX Synth 320 may include circuitry that generates a timing signal for use in transmit functions. For example, TX Synth 320 may include a local oscillator (LO) that may be used to generate a signal at a particular frequency for upconversion or downconversion of communication signals.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a BBF 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive LO signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing. RX Synth 332 may include circuitry that generates a timing signal for use in receive functions. For example, RX Synth 332 may include an LO that may be used to generate a signal at a particular frequency for upconversion or downconversion of communication signals.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine time-averaged RF exposure measurements based on transmission power levels applied to the TX path 302 (e.g., certain levels of gain at the PA 318) to set a transmission power level that complies with an RF exposure limit set by domestic regulations and international standards as further described herein.

Example RF Exposure Measurement

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm$^2$. In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter (W/m$^2$) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., 3GPP Long Term Evolution (LTE)), 5G (e.g., NR in 6 GHz bands), IEEE 802.1 lac, etc. PD may be used to assess RF exposure for transmission frequencies higher than 10 GHz, which cover wireless communication technologies such as IEEE 802.1 lad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.1 lad or 802.1 lay). In certain aspects, the wireless communication device may simultaneously transmit signals using the first wireless communication technology (e.g., 3G, 4G, 5G in sub-6 GHz bands, IEEE 802.1 lac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

To assess RF exposure from transmissions using the first technology (e.g., 3G, 4G, 5G in sub-6 GHz bands, IEEE 802.11ac, etc.), the wireless communication device may include multiple SAR distributions for the first technology stored in memory (e.g., memory 282 of FIG. 2 or memory 338 of FIG. 3). Each of the SAR distributions may correspond to a respective one of multiple transmit scenarios supported by the wireless communication device for the first technology. The transmit scenarios may correspond to various combinations of antennas (e.g., antennas 252a through 252r of FIG. 2 or antenna 306 of FIG. 3), frequency bands, channels and/or body positions, as discussed further below.

The SAR distribution (also referred to as a SAR map) for each transmit scenario may be generated based on measurements (e.g., E-field measurements) performed in a test laboratory using a model of a human body. After the SAR distributions are generated, the SAR distributions are stored in the memory to enable a processor (e.g., processor 280 of FIG. 2 or controller 336 of FIG. 3) to assess RF exposure in real time, as discussed further below. Each SAR distribution includes a set of SAR values, where each SAR value may correspond to a different location (e.g., on the model of the human body). Each SAR value may comprise a SAR value averaged over a mass of 1 g or 10 g at the respective location.

The SAR values in each SAR distribution correspond to a particular transmission power level (e.g., the transmission power level at which the SAR values were measured in the test laboratory). Since SAR scales with transmission power level, the processor may scale a SAR distribution for any transmission power level by multiplying each SAR value in the SAR distribution by the following transmission power scaler:

$$Tx_c/Tx_{SAR} \qquad (1)$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless communication device may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas to generate a SAR distribution for each one of the antennas. In this example, a SAR distribution for a transmit scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and the normalized SAR value is below the SAR limit when the normalized SAR value is less than one. In these aspects, each of the SAR distributions stored in the memory may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \quad (2)$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $Tx_{SARi}$ is the transmission power level for the SAR distribution for the $i^{th}$ active antenna, and K is the number of the active antennas.

Equation (2) may be rewritten as follows:

$$SAR_{norm\_combined} = \sum_{i=1}^{i=K} \frac{Tx_i}{Tx_{SARi}} \cdot SAR_{norm\_i} \quad (3a)$$

where $SAR_{norm\_i}$ is the normalized SAR distribution for the $i^{th}$ active antenna. In the case of simultaneous transmissions using multiple active antennas at the same transmitting frequency (e.g., MIMO), the combined normalized SAR distribution is obtained by summing the square root of the individual normalized SAR distributions and computing the square of the sum, as given by the following:

$$SAR_{norm\_combined\_MIMO} = \left[\sum_{i=1}^{i=K} \sqrt{\frac{Tx_i}{Tx_{SARi}} \cdot SAR_{norm\_i}}\right]^2 \quad (3b)$$

In another example, normalized SAR distributions for different frequency bands may be stored in the memory. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using Equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G in 24 to 60 GHz bands, IEEE 802.1 lad, 802.1 lay, etc.), the wireless communication device may include multiple PD distributions for the second technology stored in the memory (e.g., memory 282 of FIG. 2 or memory 338 of FIG. 3). Each of the PD distributions may correspond to a respective one of multiple transmit scenarios supported by the wireless communication device for the second technology. The transmit scenarios may correspond to various combinations of antennas (e.g., antennas 252a through 252r of FIG. 2 or antenna 306 of FIG. 3), frequency bands, channels and/or body positions, as discussed further below.

The PD distribution (also referred to as PD map) for each transmit scenario may be generated based on measurements (e.g., E-field measurements) performed in a test laboratory using a model of a human body. After the PD distributions are generated, the PD distributions are stored in the memory to enable the processor (e.g., processor 280 of FIG. 2 or controller 336 of FIG. 3) to assess RF exposure in real time, as discussed further below. Each PD distribution includes a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor may scale a PD distribution for any transmission power level by multiplying each PD value in the PD distribution by the following transmission power scaler:

$$\frac{Tx_c}{Tx_{PD}} \quad (4)$$

where $Tx_c$ is a current transmission power level for the respective transmit scenario, and $Tx_{PD}$ is the transmission power level corresponding to the PD values in the PD distribution (e.g., the transmission power level at which the PD values were measured in the test laboratory).

As discussed above, the wireless communication device may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas to generate a PD distribution for each one of the antennas. In this example, a PD distribution for a transmit scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and the normalized PD value is below the PD limit when the normalized PD value is less than one. In these aspects, each of the PD distributions stored in the memory may be normalized with respect to a PD limit.

In certain aspects, the normalized PD distribution for a transmit scenario may be generated by combining two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \quad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $Tx_{PDi}$ is the transmission power level for the PD distribution for the $i^{th}$ active antenna, and L is the number of the active antennas.

Equation (5) may be rewritten as follows:

$$PD_{norm\_combined} = \sum_{i=1}^{i=L} \frac{Tx_i}{Tx_{PDi}} \cdot PD_{norm\_i} \quad (6a)$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution is obtained by summing the square root of the individual normalized PD distributions and computing the square of the sum, as given by the following:

$$PD_{norm\_combined\_MIMO} = \left[\sum_{i=1}^{i=L} \sqrt{\frac{Tx_i}{Tx_{PDi}} \cdot PD_{norm\_i}}\right]^2. \quad (6b)$$

In another example, normalized PD distributions for different frequency bands may be stored in the memory. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using Equation (6a) in which i is an index for the active frequency bands, $PDM_{norm\_i}$ is the normalized PD distribution for the $i^{th}$ active frequency band, $Tx_i$ is the transmission power level for the $i^{th}$ active frequency band, and $Tx_{PDi}$ is the transmission power level for the normalized PD distribution for the $i^{th}$ active frequency band.

As discussed above, the UE 120 may simultaneously transmit signals using the first technology (e.g., 3G, 4G, IEEE 802.11ac, etc.) and the second technology (e.g., 5G, IEEE 802.1 lad, etc.), in which RF exposure is measured using different metrics for the first technology and the second technology (e.g., SAR for the first technology and PD for the second technology). In this case, the processor 280 may determine a first maximum allowable power level for the first technology and a second maximum allowable power level for the second technology for transmissions in a future time slot that comply with RF exposure limits. During the future time slot, the transmission power levels for the first and second technologies are constrained (i.e., bounded) by the determined first and second maximum allowable power levels, respectively, to ensure compliance with RF exposure limits, as further below. In the present disclosure, the term "maximum allowable power level" refers to a "maximum allowable power level" imposed by an RF exposure limit unless stated otherwise. It is to be appreciated that the "maximum allowable power level" is not necessarily equal to the absolute maximum power level that complies with an RF exposure limit and may be less than the absolute maximum power level that complies with the RF exposure limit (e.g., to provide a safety margin). The "maximum allowable power level" may be used to set a power level limit on a transmission at a transmitter such that the power level of the transmission is not allowed to exceed the "maximum allowable power level" to ensure RF exposure compliance.

The processor 280 may determine the first and second maximum allowable power levels as follows. The processor may determine a normalized SAR distribution for the first technology at a first transmission power level, determine a normalized PD distribution for the second technology at a second transmission power level, and combine the normalized SAR distribution and the normalized PD distribution to generate a combined normalized RF exposure distribution (referred to simply as a combined normalized distribution below). The value at each location in the combined normalized distribution may be determined by combining the normalized SAR value at the location with the normalized PD value at the location or another technique.

The processor 280 may then determine whether the first and second transmission power levels comply with RF exposure limits by comparing the peak value in the combined normalized distribution with one. If the peak value is equal to or less than one (i.e., satisfies the condition ≤1), then the processor 280 may determine that the first and second transmission power levels comply with RF exposure limits (e.g., SAR limit and PD limit) and use the first and second transmission power levels as the first and second maximum allowable power levels, respectively, during the future time slot. If the peak value is greater than one, then the processor 280 may determine that the first and second transmission power levels do not comply with RF exposure limits. The condition for RF exposure compliance for simultaneous transmissions using the first and second technologies may be given by:

$$SAR_{norm} + PD_{norm} \leq 1 \tag{7}$$

Figure 4:
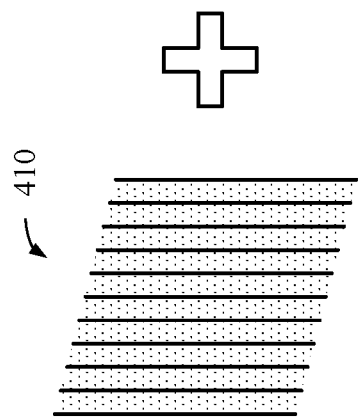
FIG. 4 is a diagram illustrating an example of a normalized specific absorption rate (SAR) distribution combined with a normalized power density (PD) distribution, in accordance with the present disclosure.
Figure 4:
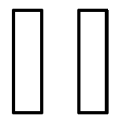
Figure 4:
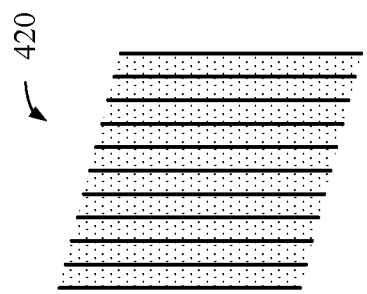
Figure 4:
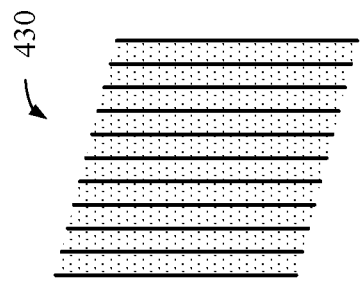

FIG. 4 is a diagram illustrating the normalized SAR distribution 410 and the normalized PD distribution 420, in which the normalized SAR distribution 410 and the normalized PD distribution 420 are combined to generate a combined normalized distribution 430. FIG. 4 also shows the condition that the peak value in the combined normalized distribution 430 be equal to or less than one for RF exposure compliance. Although each of the distributions 410, 420, and 430 is depicted as a two-dimensional distribution in FIG. 4, it is to be appreciated that the present disclosure is not limited to this example.

The normalized SAR distribution in equation (7) may be generated by combining two or more normalized SAR distributions as discussed above (e.g., for a transmit scenario using multiple active antennas). Similarly, the normalized PD distribution in equation (7) may be generated by combining two or more normalized PD distributions as discussed above (e.g., for a transmit scenario using multiple active antennas). In this case, the condition for RF exposure compliance in equation (7) may be rewritten using equations (3a) and (6a) as follows:

$$\sum_{i=1}^{i=K} \frac{Tx_i}{Tx_{SARi}} \cdot SAR_{norm\_i} + \sum_{i=1}^{i=L} \frac{Tx_i}{Tx_{PDi}} \cdot PD_{norm\_i} \leq 1. \tag{8}$$

For the MIMO case, equations (3b) and (6b) may be combined instead. As shown in equation (8), the combined normalized distribution may be a function of transmission power levels for the first technology and transmission power levels for the second technology. All the points in the combined normalized distribution should meet the normalized limit of one in equation (8). Additionally, when combining SAR and PD distributions, the SAR and PD distributions should be aligned spatially or aligned with their peak locations so that the combined distribution given by equation (8) represents combined RF exposure for a given position of a human body.

Example Transmit Antenna Grouping

Examples of optional grouping of two or more transmit antennas are described below as background for the processes described starting with FIG. 9. As will be described with respect to FIG. 9, allocation of transmit power be based on antenna groups as described herein.

Multi-mode/multi-band UEs have multiple transmit antennas, which can simultaneously transmit in sub-6 GHz bands and bands greater than 6 GHz bands, such as mmWave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless communication device may limit maximum transmit power for both sub-6 GHz bands and bands greater than 6 GHz.

In certain cases, a time-averaging algorithm for RF exposure compliance may assume all transmit antennas are collocated in a central location on the UE. Under such an assumption, the total transmit power of all transmit antennas may be limited regardless of the actual exposure scenario (e.g., head exposure, body exposure, extremity exposure) of separate antennas. For example, suppose the user's hand covers the location of the collocated model, while specific antennas are not covered by the user's hand. Enforcing the collocated model may lead to limiting the transmit power of specific antennas not actually covered by the user's hand. That is, the assumption that the transmit antennas are collocated for RF exposure compliance may provide an undesirable transmit power, which may affect uplink performance such as uplink data rates, uplink carrier aggregation, and/or an uplink connection at the edge of a cell.

Aspects of the present disclosure provide various techniques for grouping antennas, for example, to determine RF exposure compliance on a group-basis. In aspects, the antenna groups may be defined and/or operated so as to be mutually exclusive in terms of RF exposure. That is, the RF exposure compliance and corresponding transmit power levels may be determined separately for each antenna group. The antenna grouping described herein may enable desirable transmit power for specific antenna groups. The desirable transmit power may provide desirable uplink performance, such as desirable uplink data rates, uplink carrier aggregation, and/or an uplink connection at the edge of a cell.

In certain aspects, a plurality of antenna groups are defined. Each antenna group may include one or more antennas. For example, the antenna 252a may be categorized into a first antenna group and the antennas 252t may be categorized into a second antenna group. In some embodiments, each antenna array (e.g., each phased array) is placed in a different group. The groups may be defined manually, for example by a designer or test operator, or in an automated fashion, for example by an algorithm operating prior to initialization of the device or at initialization or during operation of the device. The groups may be established based on physical location (as will be described in greater detail below), operating frequency, form factor, associated method of calculating RF exposure, etc.

Figure 5:
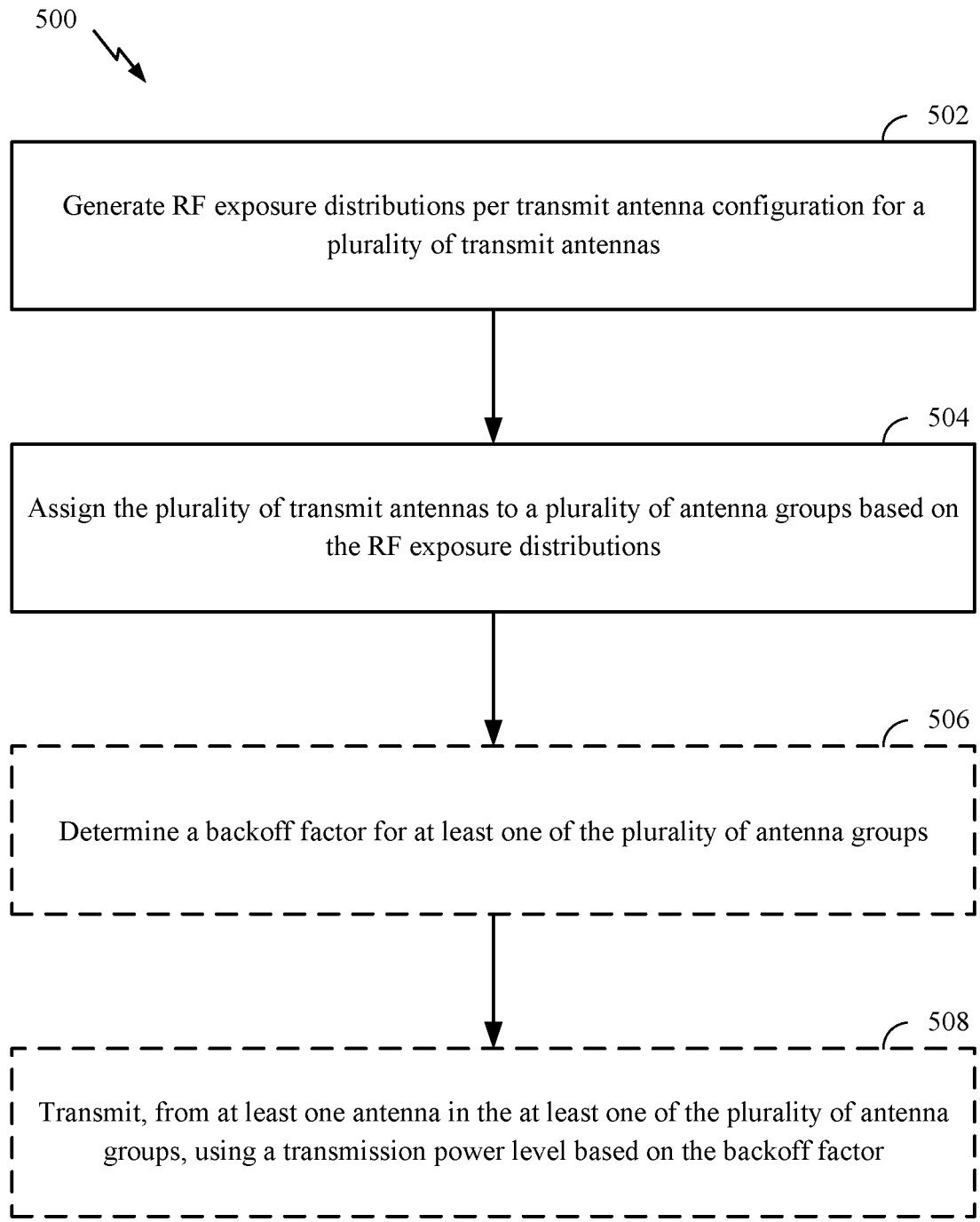
FIG. 5 is a flow diagram illustrating example operations for grouping antennas for RF exposure compliance by a UE, in accordance with the present disclosure.

FIG. 5 is a flow diagram illustrating example operations 500 for grouping antennas for RF exposure compliance, in accordance with the present disclosure. The operations 500 may be performed, for example, by a UE (e.g., the UE 120a in the wireless communication network 100). The operations 500 may be implemented as software components that are executed and run on one or more processors (e.g., controller/processor 280 of FIG. 2). Further, the transmission of signals by the UE in the operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 502, where the UE may generate RF exposure distributions per transmit antenna configuration for a plurality of transmit antennas. At block 504, the UE may assign the plurality of transmit antennas to a plurality of antenna groups based on the RF exposure distributions. At block 506, the UE may determine a backoff factor for at least one of the plurality of antenna groups. At block 508, the UE may transmit, from at least one antenna in the at least one of the plurality of antenna groups, using a transmission power level based on the backoff factor.

Figure 7:
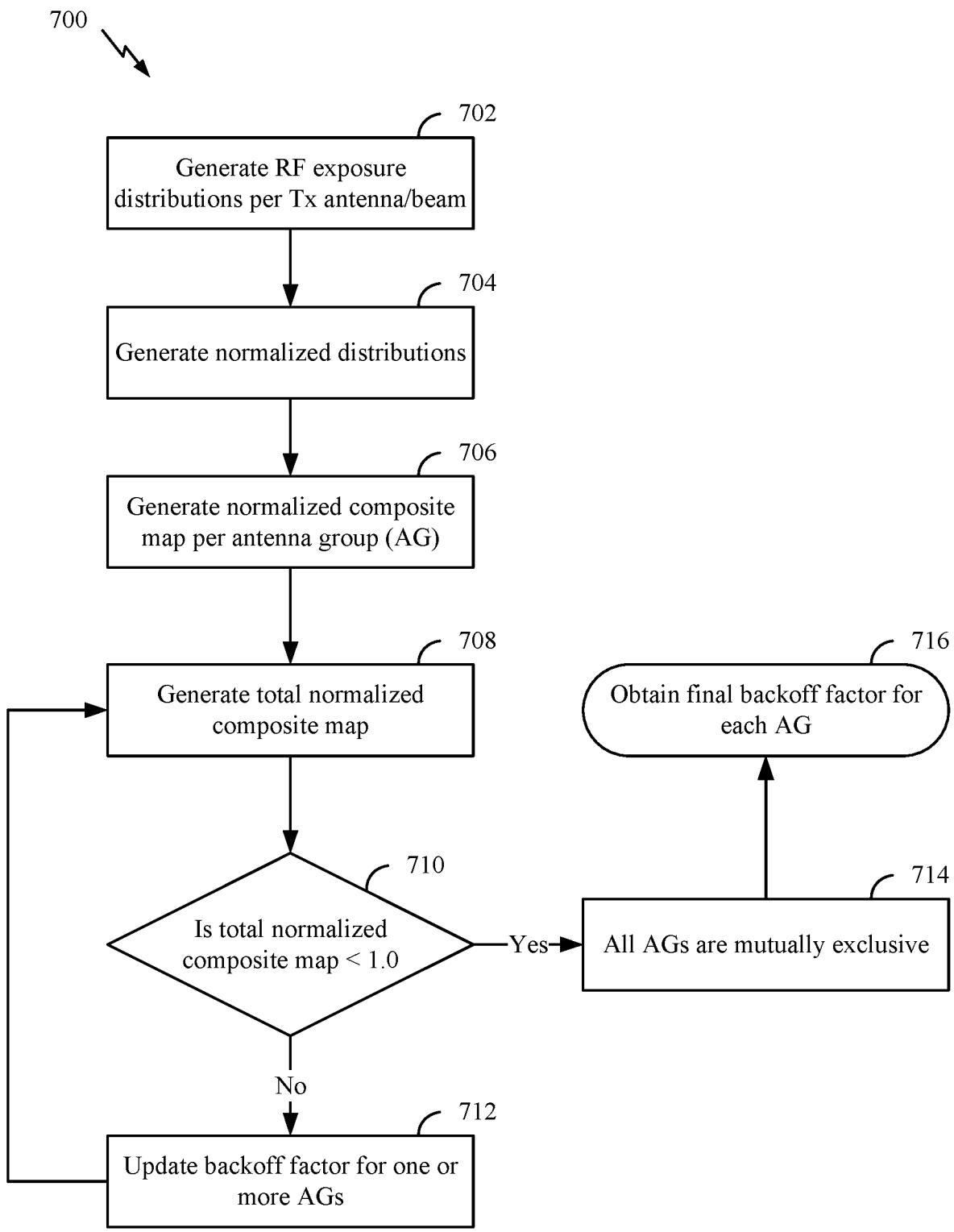
FIG. 7 is a flow diagram illustrating example operations for determining backoff factors for antenna groups, in accordance with the present disclosure.

In certain aspects, assigning the plurality of transmit antennas to the plurality of antenna groups at block 504 may involve determining backoff factors for each of the antenna groups, for example, as further described herein with respect to FIG. 7. For example, the UE may generate normalized distributions of the RF exposure distributions, generate a normalized composite map of the normalized distributions for each of the antenna groups, and generate a total of the normalized composite maps for all of the antenna groups based on a backoff factor associated with each of the antenna groups.

In aspects, the normalized distributions may be generated by dividing the RF exposure distributions by a maximum RF exposure value for a corresponding transmit antenna configuration, for example, as described herein with respect to block 702. In aspects, the normalized composite map may be generated by selecting a maximum of the normalized distributions as the normalized composite map for each of the antenna groups, for example, as described herein with respect to block 704.

In certain aspects, the total of the normalized composite maps may be generated by multiplying the normalized composite map for each antenna group with the associated backoff factor to generate a weighted normalized composite map for each antenna group and summing the weighted normalized composite maps together, for example, as described herein with respect to block 708. In certain aspects, at least one of the backoff factors may be adjusted until the total of the normalized composite maps is less than or equal to a first threshold (e.g., 1.0).

In certain cases, the UE may assign each of the plurality of transmit antennas to one of the plurality of antenna groups based on the RF exposure distributions, such that no transmit antenna is in multiple antenna groups. In certain cases, the UE may assign each of the plurality of transmit antennas to one of the plurality of antenna groups based on the RF exposure distributions, such that there is at least one transmit antenna in multiple antenna groups.

Figure 8:
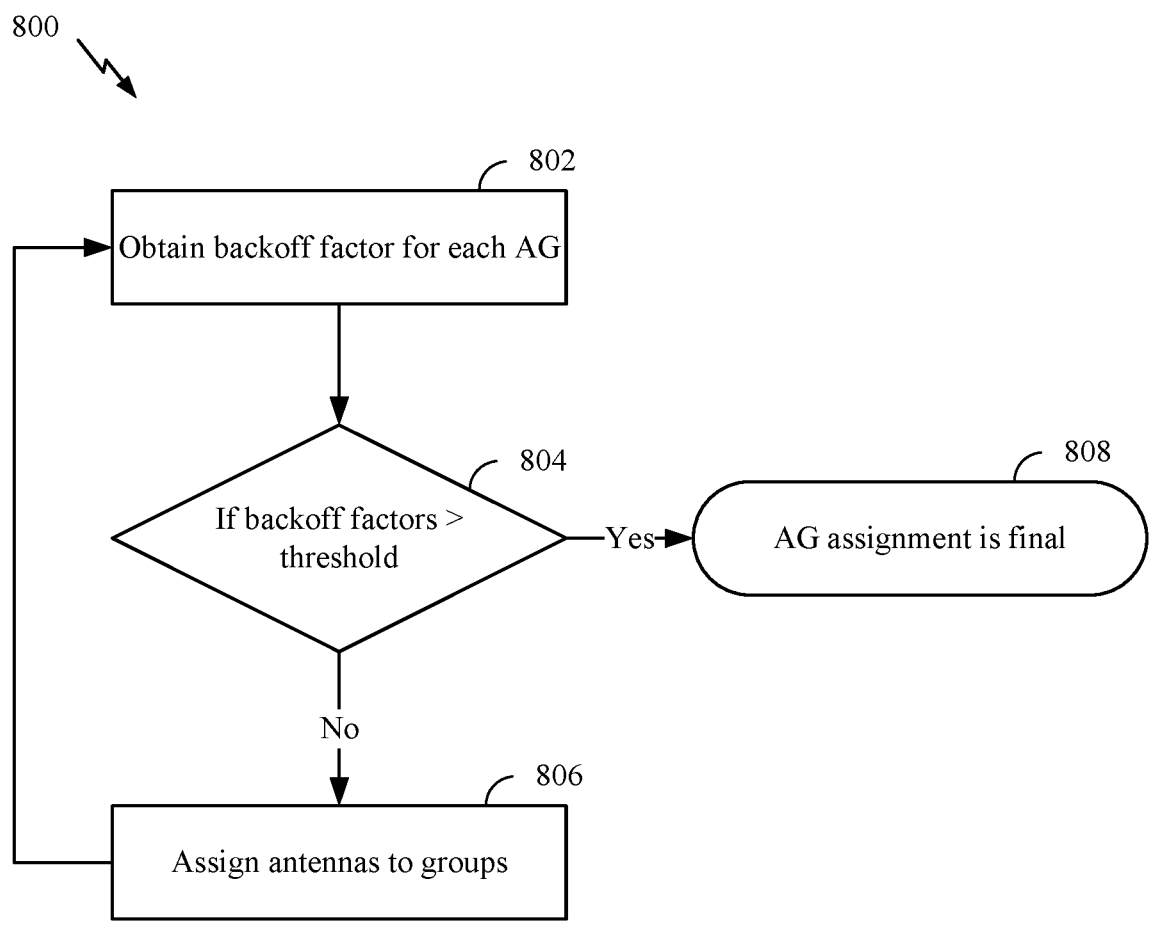
FIG. 8 is a flow diagram illustrating example operations for assigning antennas to groups based on the backoff factors, in accordance with the present disclosure.

In aspects, the plurality of transmit antennas may be assigned to the plurality of antenna groups at block 504 based on the value of the determined backoff factors, for example, as further described herein with respect to FIG. 8. The transmit antennas may be redistributed or regrouped if one of the backoff factors is less than a second threshold (e.g., 0.5). For example, the UE may determine the backoff factors for a first grouping of the antenna groups, for example, as described herein with respect to FIG. 7, and assign the transmit antennas to a second grouping of the antenna groups, if at least one of the backoff factors for the first grouping is less than a second threshold (e.g., 0.5). In certain cases, the first grouping may include a separate antenna group for each transmit antenna, and the second grouping may include at least one antenna group having multiple transmit antennas. That is, the first iteration of the antenna grouping procedure may involve determining backoff factors for each antenna and determining which transmit antennas to group together based on the backoff factors.

The UE may repeat determining the backoff factors and reassigning the transmit antenna to antenna groups until all of the backoff factors are greater than the second threshold. For example, the UE may determine the backoff factors for the second grouping of the antenna groups, for example, repeating the operations described herein with respect to FIG. 7 and assign the transmit antennas to a third grouping of the antenna groups, if at least one of the backoff factors for the second group is less than the threshold.

In certain aspects, an antenna group may include mixed-mode antennas (e.g., sub-6 GHz and mmWave antennas). For example, at least one of the antenna groups comprises a first antenna configured to transmit in a first mode and a second antenna configured to transmit in a second mode. The first mode may be sub-6 GHz, and the second mode may be mmWave. In other words, the first mode may be transmitting at one or more frequencies below 6 GHz, and the second mode may be transmitting at one or more frequencies above 6 GHz (for example, 24 GHz to 53 GHz or beyond).

In aspects, a transmit antenna configuration may include a specific antenna or a transmit beam configuration of an antenna module having multiple antennas. In aspects, at least one of the transmit antennas is part of an antenna module having multiple antennas.

In certain cases, the antenna grouping may be used to determine RF exposure compliance and corresponding transmit power levels. For example, the UE may transmit a signal at a transmission power level based on enforcing the RF exposure compliance for at least one of the antenna groups.

In aspects, the RF exposure compliance may include evaluating the RF exposure compliance in terms of time-averaged RF exposure such as a time-averaged SAR or a time-averaged PD over a time window. In aspects, the time window may be in a range from 1 second to 360 seconds. For example, the time window may be 100 seconds or 360 seconds. The range from 1 second to 360 seconds is an example, and other suitable values for the time window may be used. In certain cases, the time window may be less than 1 second, such as 500 milliseconds. In certain cases, the time window may be greater than 360 seconds, such as 600 seconds.

In aspects, the UE may be communicating with a base station, such as the BS 110. For example, at 508, the UE may be transmitting, to the base station, user data on a PUSCH or various uplink feedback (e.g., uplink control information or HARQ feedback) on a PUCCH. In certain cases, the UE may be communicating with another UE. For example, at 508, the UE may be transmitting, to the other UE, user data and/or various feedback on sidelink channels.

Figure 6:
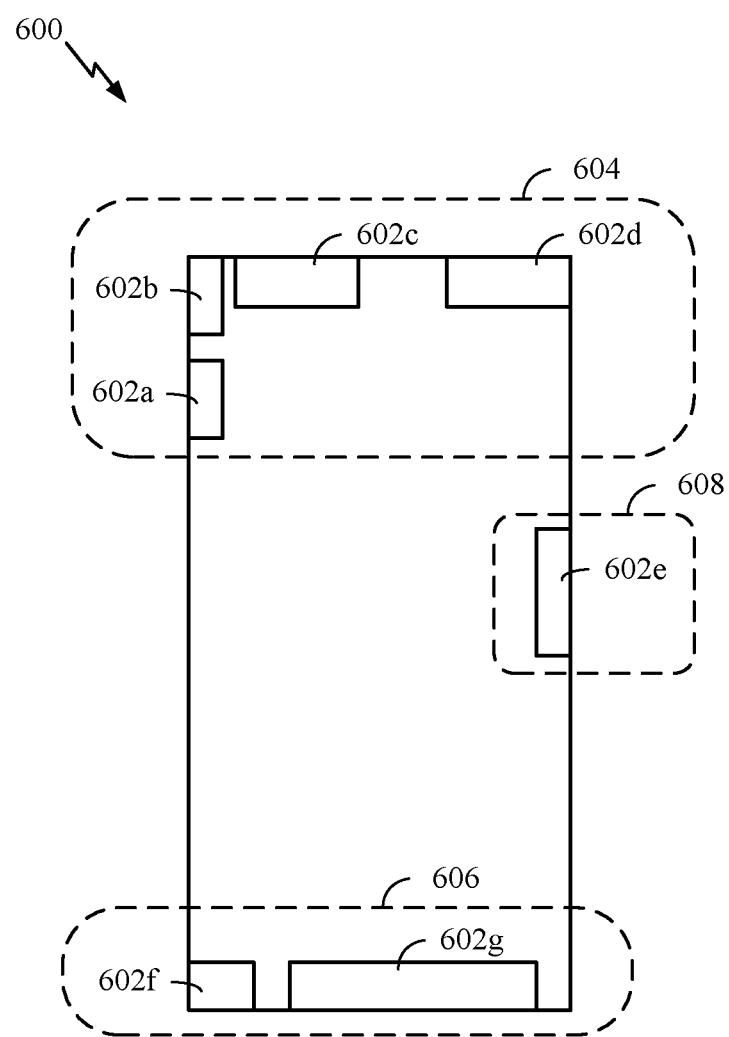
FIG. 6 is a block diagram illustrating an example grouping of multiple antennas of a wireless communication device, in accordance with the present disclosure.

FIG. 6 is a block diagram illustrating an example grouping of multiple antennas of a wireless communication device 600, in accordance with the present disclosure. In this example, the wireless communication device 600 (e.g., a mobile phone or any of the wireless communication devices described herein) includes a first antenna 602a, a second antenna 602b, a third antenna 602c, a fourth antenna 602d, a fifth antenna 602e, a sixth antenna 602f, and a seventh antenna 602g. Those of skill in the art will appreciate that more or less antennas may be implemented, and/or more or less antenna groupings may be defined. In this example, the antennas 602a-602g are separated into three antenna groups 604, 606, 608, which roughly correspond to a top of the wireless communication device 600, a bottom of the wireless communication device 600, and a side of the wireless communication device 600. Each of the illustrated antennas 602a-602g may comprise a single antenna, an array (e.g., a phased array) of antennas, or a module including one or more antennas. The antenna groups 604, 606, 608 may each include antennas that are all configured to transmit in a certain frequency band (e.g., very high, high, medium, low) or one or more groups may include antennas that are configured to transmit in multiple frequency bands.

A plurality of radios (not illustrated) may be implemented in the wireless communication device 600 and coupled to the antennas/antenna groups. For example, a first radio may be coupled to all of or a subset of the sub-6 GHz antennas, and a second radio may be coupled to all or a subset of the mmWave antennas. In some examples, wireless local area network (WLAN) and/or Bluetooth radios may also be included in the wireless communication device 600 and coupled to one or more of the antennas to which the first or second radios are coupled, and/or to a different set of one or more antennas. Each radio may be coupled to only antenna(s) in a single group, or to antennas across multiple groups. A radio may include circuitry configured to process communication signals for a RAT. Each radio may be implemented in a separate modem or processor, such as the data source 262 and/or the controller/processor 280, or two or more radios may be implemented in a single processor or IC. In some embodiments, multiple processors are implemented on several chips in a single module or package.

Antenna groups may be defined and/or operated so as to be mutually exclusive in terms of RF exposure. In certain aspects, the transmit power of one or more of the groups (or of one or more of the antennas within one or more groups) may be reduced such that the sum of the exposure of all antenna groups, or of the overlapped RF exposure distributions, are less than a particular value (e.g., 1.0). For example, backoff factors may be determined for one or more groups, or one or more antennas within one or more groups, and applied so as to limit transmission power for the antenna(s) and/or groups.

As an example, the backoff factor bf may be between [0 1] for each antenna group, such that the maximum permissible transmit power for each antenna group equals the respective backoff factor times the transmit power limit of the antenna group (e.g., bf*Tx_power limit), where bf=1 represents no backoff, and bf=0.3 signifies to operate the antenna group at 30% of the transmit power limit.

FIG. 7 is a flow diagram illustrating example operations 700 for determining backoff factors for antenna groups, in accordance with the present disclosure. The operations 700 may be performed, for example, by a UE (e.g., the UE 120a in the wireless communication network 100). In order to determine such backoff factors, at block 702, RF exposure distributions (simulation/measurement) may be generated per transmit antenna/configuration (beam) (as described above) on all evaluation surfaces/positions at all locations. For example, the RF exposure distributions may be represented by the expression: RFexp(s,x,y,z,i), where s represents a particular surface or position, (x, y, z) represent a given location, and i represents a particular transmit configuration, such as an specific antenna or beam. In certain cases, a transmit antenna may support multiple bands, so multiple RF exposure distributions for each band/channel (low/mid/high) may be available for a specific transmit antenna. In that case, RF exposure distribution for a specific transmit antenna can represent the maximum exposure out of all technologies/bands/channels supported by the transmit antenna at each location/exposure surface.

Then, at block 704, normalized distributions (maps) may be calculated by collecting exposures on all surfaces/positions per transmit antenna/beam and dividing by the corresponding maximum value. For example, the normalized distributions may be represented by the expression: normalized.map(s,x,y,z,i)={RFexp(1,x,y,z,i); RFexp(2,x,y,z,i); . . . ; RFexp(s,x,y,z,i)}/maxRFexp(i).

Thereafter, at block 706, a normalized composite map per antenna group may be calculated, for example based on a maximum of the normalized distributions in the group. For example, a normalized composite map may be given by the expression: normalized.composite.map.$AG_k$ (s,x,y,z)=maximum {normalized.map(s,x,y,z,i), $\forall$i=1 to n antennas/beams inside $AG_k$}, where $AG_k$ represents a specific antenna group (AG).

Further, at block 708, a total normalized composite map may be calculated for all of the antenna groups, for example based on a sum of all of the normalized composite maps. As an example, the total normalized composite map may be given by the expression:

Total.normalized.composite.map(s,x,y,z)=
$\Sigma_{k=1}^{M}\{bf_k*$normalized.composite.map.$AG_k$(s,x,y,z)$\}$ where $bf_k$ represents the backoff factor for a specific antenna group.

In certain aspects, at block 710, it may be determined whether the total normalized composite map is less than a threshold (for example, 1.0). If this condition is not satisfied, the expected or potential power for one or more antennas (or one or more antenna groups) may be reduced using an updated backoff factor. At block 712, backoff factors may be adjusted for one or more of the antenna groups, and the total normalized composite map may be recalculated using the updated backoff factors. The backoff factor for each antenna and/or group may be adjusted until the condition (e.g., the total normalized composite map is less than or equal to the threshold) at block 710 is satisfied.

At block 714, if the total normalized composite map is less than the threshold (for example, 1.0), the antenna groups are considered to be mutually exclusive in terms of RF exposure, and at block 716, the final backoff factors for each antenna group may be obtained. The backoff factors may be used for determining transmission power levels for specific antenna groups, as further described herein, or for other purposes such as determining actual or potential interference.

FIG. 8 is a flow diagram illustrating example operations 800 for assigning antennas to groups based on the backoff factors (for example as determined in the operations 700), in accordance with the present disclosure. The operations 800 may be performed, for example, by a UE (e.g., the UE 120a in the wireless communication network 100).

At block 802, the backoff factors for each antenna group may be obtained, for example, after completing the operations 700 with a certain antenna grouping. For example, the operations 700 may be first performed using a separate group for each of the antennas/beams to obtain the backoff factors for individual antennas at block 802.

At block 804, it may be determined whether each of the backoff factors is greater than or equal to a threshold (for example, 0.5). If this condition is not satisfied, at block 806, the antennas may be reassigned or redistributed among the antenna groups. In certain cases, for antennas/antenna groups that have a low backoff factor (e.g., a backoff factor <0.5), based on spatial distribution, some of the antennas can be grouped together into the same antenna group resulting in a reduction in the number antenna groups. Suppose, for example, in the first iteration a separate group is used for each antenna, where antennas 1-7 are in antenna groups AG1 to AG7, respectively. The corresponding backoff factors are: $bf1=bf2=-0.5$, $bf3=-1$, $bf4=bf5=bf6=bf7=-0.25$. Then, updated antenna groups may be AG1={Ant4, Ant5, Ant6, Ant7}, AG2={Ant1, Ant2}, and AG3={Ant3}. In certain cases, specific antennas may be grouped together such that the sum of the backoff factors for the specific antennas is above the threshold at block 804. At block 802, the operations 700 or a portion (e.g., blocks 706-716) of the operations 700 may be repeated to determine the updated backoff factors for the reassigned antenna groups. The antenna grouping/backoff factor generation may be repeated until all of the backoff factors satisfy the conditions at both block 710 and block 804. If the conditions at these blocks are satisfied, the antenna group assignment may be considered final, as shown at block 808.

The antenna grouping operations described herein may be determined and/or applied per device state index (DSI) indicating a device's exposure scenario (head exposure, body exposure, extremity exposure). For example, head exposure may have four exposure positions (right cheek, right tilt, left cheek, left tilt), and these four positions can be collected together (e.g., at block 704, into a normalized map; in certain cases, the value of s will range from [1 4], to account for the four exposure positions). Body exposure may have two exposure positions (front surface, back surface), and these two exposure positions can be collected together (e.g., at block 704). Extremity exposure may have six exposure positions at 0 mm separation distance (front/back/left/right/top/bottom surfaces of device), and these six positions can be collected together (e.g., at block 704).

In certain aspects, the antenna grouping operations described herein can be combined with existing approaches for some exposure configurations, e.g., if the absolute sum of maximum RF exposure values for all antenna groups (e.g., total normalized composite map) is less than a regulatory limit, then the above procedure of adjusting the power/backoff factors may be skipped.

While the examples provided herein are described with respect to the UE performing various operations in determining the antenna grouping, aspects of the present disclosure may also apply to scenarios where the antenna grouping and backoff factor derivation operations are conducted in a laboratory setting, and certain calculations or simulations are performed external to the UE, for example, by a separate processing system. That is, the various functions for antenna grouping and backoff factor derivation operations need not be done at the UE itself, but that the UE may be configured to store/access/utilize specific information derived from the antenna grouping operations, such as the backoff factors and antenna grouping assignments.

Example Allocations of Transmit Power

Aspects of the present disclosure provide various techniques for allocating transmit power to one or more radios and/or across one or more antennas or antenna groups. In certain situations, as the antenna grouping described herein may provide mutually exclusive antenna groups in terms of RF exposure, the RF exposure compliance (and power allocated) for each antenna group and/or radio coupled thereto may be determined separately. The power allocation and RF exposure compliance described herein may enable desirable transmit power for specific radios and/or antenna groups, for example, due to differing environments and/or exposure scenarios encountered by a UE and/or each antenna group within the UE. The desirable transmit power may provide desirable uplink performance, such as desirable uplink data rates, uplink carrier aggregation, and/or an uplink connection at the edge of a cell.

Figure 9:
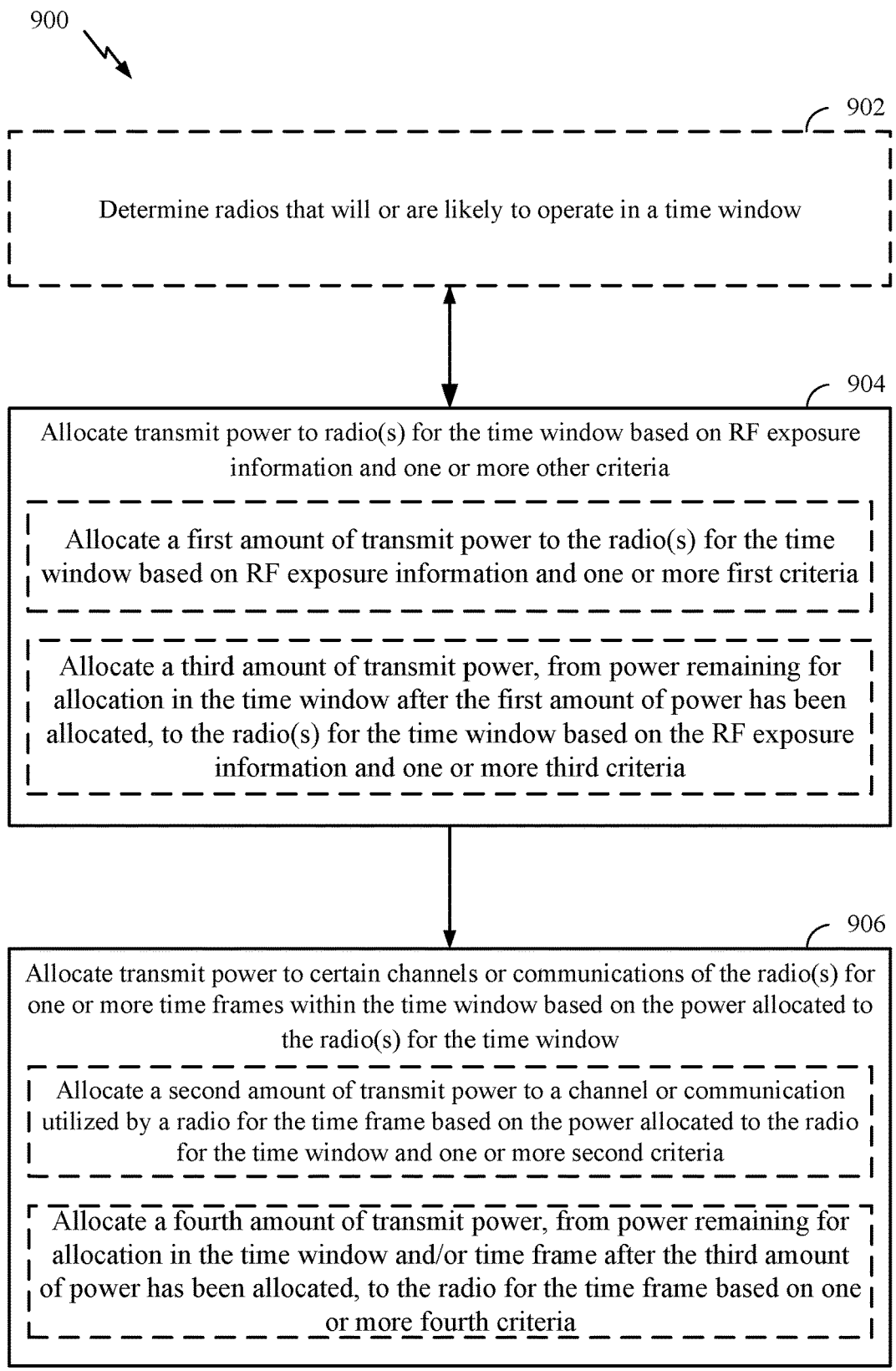
FIG. 9 is a flow diagram illustrating example operations for wireless communication by a UE, in accordance with the present disclosure.

FIG. 9 is a flow diagram illustrating example operations 900 for wireless communication, in accordance with the present disclosure. The operations 900 may be performed, for example, by a UE (e.g., the UE 120a in the wireless communication network 100). The operations 900 may be implemented as software components that are executed and run on one or more processors (e.g., controller/processor 280 of FIG. 2) or by special purpose circuits. Further, the transmission of signals by the UE in the operations 900 may be enabled, for example, by one or more antennas (e.g., antennas 252 of FIG. 2, antennas 602 of FIG. 6). In certain aspects, the transmission and/or reception of signals by the UE may be implemented via a bus interface of one or more processors (e.g., controller/processor 280) obtaining and/or outputting signals.

The operations 900 may begin, at block 902, where the UE (or the processor 280, specifically) may optionally determine radios that are likely to operate within a time window (for time-average RF exposure determination/calculation). This determination may indicate one or more radios that will be operating or are likely to operate within the time window. In some other aspects, the set of radio(s) are already known or are determined by another component of the UE and communicated to processor 280, for example.

At block 904, the UE (e.g., the processor 280) may allocate power to each radio determined to be operating or likely to operate in the time window based on RF exposure information and one or more other criteria (sometimes referred to as first criteria). For example, each radio may be assigned a priority and/or certain communications that the radio may transmit may be assigned a priority. This information may be used to allocate available transmit power in the time window to each radio. The amount of power allocated at block 904 may be referred to as a first amount of power, a minimum or reserve power, or an initial power.

In some aspects, a minimum quantity and/or type(s) of transmission from each radio may be required to maintain a link with a network and/or or other devices. The power allocated to each radio at block 904 may be enough to maintain the link for all (or a subset, in some embodiments) radios. For example, a duty cycle of transmission and/or maximum power required for such transmissions may be used to calculate how much power will be required to maintain the link for each radio over the time window. That power may be initially allocated to each radio. In some other embodiments, a quality of service required for one or more radios may be used to determine the initial power allocated to those radios.

A minimum or reserve power (e.g., the initial power, also referred to as the first amount of power, as described above) required or requested to be assigned by a radio may vary. For example, the minimum or reserve power may vary based on the RAT, the distance to a base station, the power rating of the radio and/or of the components attached thereto, the geographic location and/or regulatory jurisdiction in which the UE is located, etc. In some aspects, the minimum or reserve power (e.g., the first amount of power) may be based on an amount of power required to transmit one or more essential and/or high priority channels, such as one or more channels associated with essential signals (e.g., the PUCCH, a sounding reference signal, a random access channel, etc.). In some aspects, the minimum or reserve power (e.g., the first amount of power) may be based on a network configuration. For example, an amount of power required to maintain a link may be based on a frame configuration, a frequency range (e.g., whether the link is in FR1 or FR2), or the like. In some examples, the radios which will be used (e.g., an FR1 radio and an FR2 radio, or an LTE radio and an NR radio) are known and power (e.g., a first amount of power) is allocated accordingly in block 904. In other examples, the UE (e.g., the processor 280) may select between several different radios based on the minimum or reserve power required for each radio, for example when there is an option to communicate over different RATs and/or using different frequencies. The UE may, for example, prioritize a radio with a lower minimum or reserve power, prioritize a radio which allows for exposure requirements to be satisfied, etc. In some examples, when there is an insufficient amount of power to transmit multiple desired communications, a radio associated with a higher priority communication may be selected or enabled over a radio associated with a lower priority communication. For example, a user application which is transmitted using a first RAT (e.g., LTE) may be prioritized over another user application which is transmitted using a second RAT (e.g., NR). In some embodiments, data or communications associated with a first radio access technology or frequency range may be prioritized over data or communications associated with a second radio access technology or frequency range. For example, data or communications associated with a mmW radio access technology may be prioritized over data or communications associated with a sub-6 GHz radio access technology. Allocating a first amount of power to one radio versus another in block 904 may implicitly select between using certain RATs, frequency ranges, etc.

In some aspects, there may be insufficient power to support a combination of channels of the same type of channel, or a combination of channels of the same priority. For example, the first amount of power required for the combination of channels may be insufficient to support a link associated with the combination of channels. If there is insufficient power to transmit all of a set of channels, and all of the set of channels are associated with a same priority, then the UE may prioritize one channel over another channel. For example, the UE may prioritize a first channel (e.g., a first control channel) over a second channel (e.g., a second control channel) based on a frequency range associated with the first channel and a frequency range associated with the second channel. In some examples, the UE may prioritize a channel associated with a higher frequency range (e.g., FR2) over a channel associated with a lower frequency range (FR1). These prioritization techniques may be useful for "essential" signals, such as a PUCCH, a sounding reference signal, and a random access channel, though these prioritization techniques can be applied for any type of channel. In some examples, this prioritization may lead to selecting (or enabling) one radio (corresponding to the channel with a higher priority) over another radio, for example when there is insufficient resources to transmit on a lower priority channel, and/or to effectively blocking a lower priority channel and/or radio. In some such examples, this may result in a lower priority essential channel (e.g., a control channel) being blocked.

In some examples, an amount of power required to maintain a link may vary based on a network configuration indicating a PUCCH format, so the minimum or reserve power may vary based on the PUCCH format. In this case, the first amount of power may be determined based on a duty cycle associated with the PUCCH. A leftover power (e.g., a third amount of power, power in excess of a power required to transmit on a set of high priority channels) and/or dynamically allocated power (e.g., a second amount of power) may be allocated based on a duty cycle associated with another type of communication, such as a duty cycle associated with a PUSCH (e.g., a discretionary communication). In some other aspects, the minimum or reserve power may be fixed irrespective of network configuration.

In some aspects, the minimum or reserve power may be based on an amount of power to transmit essential signaling (e.g., one or more channels or signals, for example associated with control signaling and/or to maintain a link associated with the one or more channels) and an amount of power to transmit a high priority other channel, communication, or application (e.g., to maintain a voice link). For example, the minimum or reserve power may be configured to reserve a portion of RF exposure margin for the duration of a time window. The minimum or reserve power may be based on a transmit power for the essential signaling and voice communication (and may be pathloss dependent) and may be based on respective duty cycles of a control channel of the essential signaling and a channel for the voice communication. For example, the normalized RF exposure margin for a PUCCH may be defined by: PUCCH Tx power*estimated control channel duty cycle/Allocated_power, wherein Allocated_power indicates an allocated uplink transmission power limit for a time frame and PUCCH Tx power indicates a transmit power of a PUCCH in the time frame. The normalized RF exposure margin for a voice communication may be defined by: voice Tx power*estimated voice duty cycle/Allocated_power and voice Tx power indicates a transmit power of the voice communication in the time frame. The total reserve margin (e.g., the first amount of power) for a given radio may be defined by the sum of the normalized RF exposure margin for PUCCH and the normalized RF exposure margin needed for voice.

The estimated control channel duty cycle and the estimated voice duty cycle in the above equations may be based on a higher layer estimate of ongoing scheduling rates (such as scheduling by a gNB). Since scheduling can change, the scheduling rate may deviate from the scheduling rate used to determine the estimated margins, in some cases. For example, if the gNB schedules an increased number of control channel or voice grants that causes minimum power for the control channel or voice communications to exceed the estimated margin, then the UE may have to drop the link to stay RF exposure compliant. To prevent dropping of the link, the UE may set aside a margin, referred to herein as a buffer margin, which may accommodate fluctuations in estimated reserve margins. For example, the total reserve margin (e.g., the minimum or reserve power), incorporating the buffer margin, may be given by the sum of the normalized RF exposure margin needed for PUCCH, the normalized RF exposure margin needed for voice, and the buffer margin. Thus, the first amount of power includes a buffer margin in addition to the amount of power to transmit the one or more high priority channels and the amount of power to transmit the voice communication. The buffer margin may be given by $P_{max}$*100% duty cycle/Allocated_power*($\Delta t$/T). Thus, the buffer margin may correspond to the RF exposure margin sufficient for the UE to transmit continuously at $P_{max}$ for up to a time duration of '$\Delta t$' out of T seconds of a time window (sometimes referred to as a time-averaging window). In some aspects, $\Delta t$ may be defined by a time frame of a time-averaging algorithm for RF exposure. In some aspects, $\Delta t$ may be based on network scheduling. For example, the UE may increase or decrease $\Delta t$ based on variations in network scheduling. The usage of the buffer margin may accommodate fluctuation in estimated RF exposure margin for essential signaling and/or other communications such as voice communication.

If the UE performs control channel or voice transmissions at less than or equal to the allocated margins (e.g., the total reserve margin incorporating the buffer margin), then the buffer margin may not be used. Thus, the power management may run at (100%−buffer margin) efficiency in terms of overall time-averaged RF exposure. In some aspects, the buffer margin may be determined based on rate of fluctuations in network scheduling (e.g., as a function of the rate of fluctuations).

After the initial power (e.g., a first amount) is allocated to each radio, any power leftover (in relation to the amount of power available for transmission within the window) may be allocated among the radios, for example according to one or more criteria (referred to herein as one or more third criteria) described below. The leftover power allocated to a radio may be referred to herein as a third amount of power. In some embodiments, the remaining power available for allocation may be evenly split among the radios determined in block 902. In some other embodiments, a hierarchy or priority assigned by the system or by a user may be used to assign or allocate any remaining power. For example, any remaining power may first be allocated to a high priority radio or the highest priority radio. One such configuration may include assigning power (e.g., a third amount) to an LTE radio (e.g., for the purpose of transmitting or maintaining an anchor for E-UTRA-NR dual connectivity (EN-DC) call) before assigning power to an NR radio. If the power that remains to be assigned is greater than a maximum transmit power (e.g., an absolute maximum, a maximum defined for the time window, etc.) for the high or highest priority radio, a power amount up to the maximum may be allocated to the high or highest priority radio and any additional remaining power may be allocated to other radios, for example based on the same criteria (e.g., a hierarchy or other ranking of priority) or different criteria (e.g., a different ranking than used previously, an even division of power among the other radios, etc.). In some aspects, the power leftover may be allocated based on historical power usage of one or more radios. For example, if a first radio has historically used less than all of the power allocated to the first radio and a second radio has historically used all of the power allocated to the second radio, then the UE may prioritize allocation of leftover power to the second radio over the first radio. For example, the UE may allocate more leftover power to the second radio than the first radio, may allocate all leftover power to the second radio, or the like.

If a radio is coupled to multiple antenna groups, all of the antenna groups may be taken into consideration when determining the RF exposure information in block 904, or a subset of antenna groups coupled to the radio may be used to determine the RF exposure information (e.g., based on likely transmit conditions, a position of the phone or user hand positions, etc.). In situations in which multiple antenna groups are taken into account, it may be assumed that the radio will be transmitting using all of the antenna groups, or the antenna group with the highest potential exposure (e.g., calculated using SAR, MPE, a combination of both, or another rubric) may be used to allocate power to the radio, for example.

In some embodiments or modes of operation, all radios are assumed to be coupled to antennas in a single group. In such embodiments or modes, the available power within the time window is distributed among the radios based on one or more criteria, for example as described above (e.g., based on a maximum requirement to maintain a link or connection, a priority or other hierarchy, a quality of service, etc.).

In some embodiments or modes of operation, antennas coupled to the radios are assigned to antenna groups that are mutually exclusive (or mutually orthogonal) from an RF exposure perspective. In such embodiments, the power may be allocated to the radios coupled to each antenna group independent of the radios coupled to the other antenna groups. For example, the full power available in the transmit window may be allocated to a radio if the radio is the only radio coupled to an antenna group because any transmissions from radios coupled to other antenna groups will be separate from an RF perspective. Thus, the initial power and any remaining power may be allocated based on characteristics of two or more respective antenna groups. It should be noted that, in accordance with the description of the antenna groups above, when transmitting from an antenna group, the transmit power may be scaled by a backoff factor to maintain orthogonality with other antenna groups. In some such embodiments, the UE may concurrently determine the time-averaged RF exposures for each of the antenna groups and allocate transmit power to the radio(s) coupled thereto based on such determination. In other words, the mutual exclusivity of the antenna groups may enable the UE to determine the time-averaged RF exposures and/or allocate power for two or more radios in parallel with (e.g., independent of) each other.

In certain cases, the groups of the transmit antennas may not be stored explicitly in the UE. In aspects, the grouping of the transmit antennas may be implicitly indicated by various backoff factors assigned to transmit antennas. That is, the antenna groupings may be represented by backoff factors. For example, certain antennas may share the same backoff factor, such that these antennas are implicitly assigned to the same group. In aspects, the transmission power level may be based on at least one backoff factor of the backoff factors.

In certain aspects, a transmission power level may be determined/allocated based on a sum of the RF exposures being less than or equal to a threshold (e.g., 1.0). For example, the UE may transmit a signal at the transmission power level based on a sum of RF exposures for each of the antenna groups being less than or equal to a threshold. In some such scenarios, this is accomplished by applying the backoff factor(s) described above to the determined transmission power level; such determined transmission power level will be within (e.g., equal to or less than) the power allocated to the radio(s) (at block 904) coupled thereto.

In some embodiments or modes of operation, RF exposure distribution maps are calculated not merely for antennas and/or antenna groups, but in the space (e.g., x, y, z) surrounding the UE, e.g., for each tech/band/antenna, etc. Such distribution maps may be stored on the UE, for example. The power allocated at block 904 may be for each point to which a radio is expected to transmit. In this way, the power allocated at block 904 may be assigned on a much more granular level, in contrast to certain of the coarser methods or techniques described above.

At block 906, the UE allocates (e.g., dynamically) transmit power to certain channels or communications of the radio(s) (to which power was allocated in block 904) for one or more time frames within the time window based on the power allocated to the radio(s) in block 904. For example, based on one or more conditions that vary within the time window, the UE may adjust power allocated to a particular channel, communication, etc. such that the time-averaged power of all transmissions from a radio during the window are equal to or less than the power allocated to the radio at block 904.

In some embodiments, there is a single time frame (e.g., spanning the entirety of the time window, commensurate in duration with the time window, or consisting of a portion of the time window) within the time window. In other embodiments, the time window is divided into a plurality of time frames. The time window may have a length T, and the time frames may have a length Δt. In some examples, the length of the time window may be, for example, 100 seconds or 360 seconds. In some examples, the length of a time frame may be, for example, 0.5 seconds.

During each time frame, the UE may allocate power (e.g., a second amount) to one or more channels and/or communications utilized by the radio. The second amount of power may be a variable amount of transmit power. For example, the second amount of power may vary from time frame to time frame. The UE may allocate power, of the first amount and the third amount allocated to a particular radio, for one or more channels and/or communications. Thus, power allocated to the channels or communications, and the way in which the radio utilizes the power available to it, may vary between time frames, and thus may vary across different portions of the time window. It should be noted, however, that the second amount of power (e.g., the power allocated to the channels or communications), while varying across different portions of the time window, is compliant with the first amount of power and the third amount of power, as allocated to the radio transmitting the channels or communications, throughout the time window, as described herein. An example of how transmit power may be allocated among different channels pursuant to block 906 is described with respect to FIG. 10.

Figure 10:
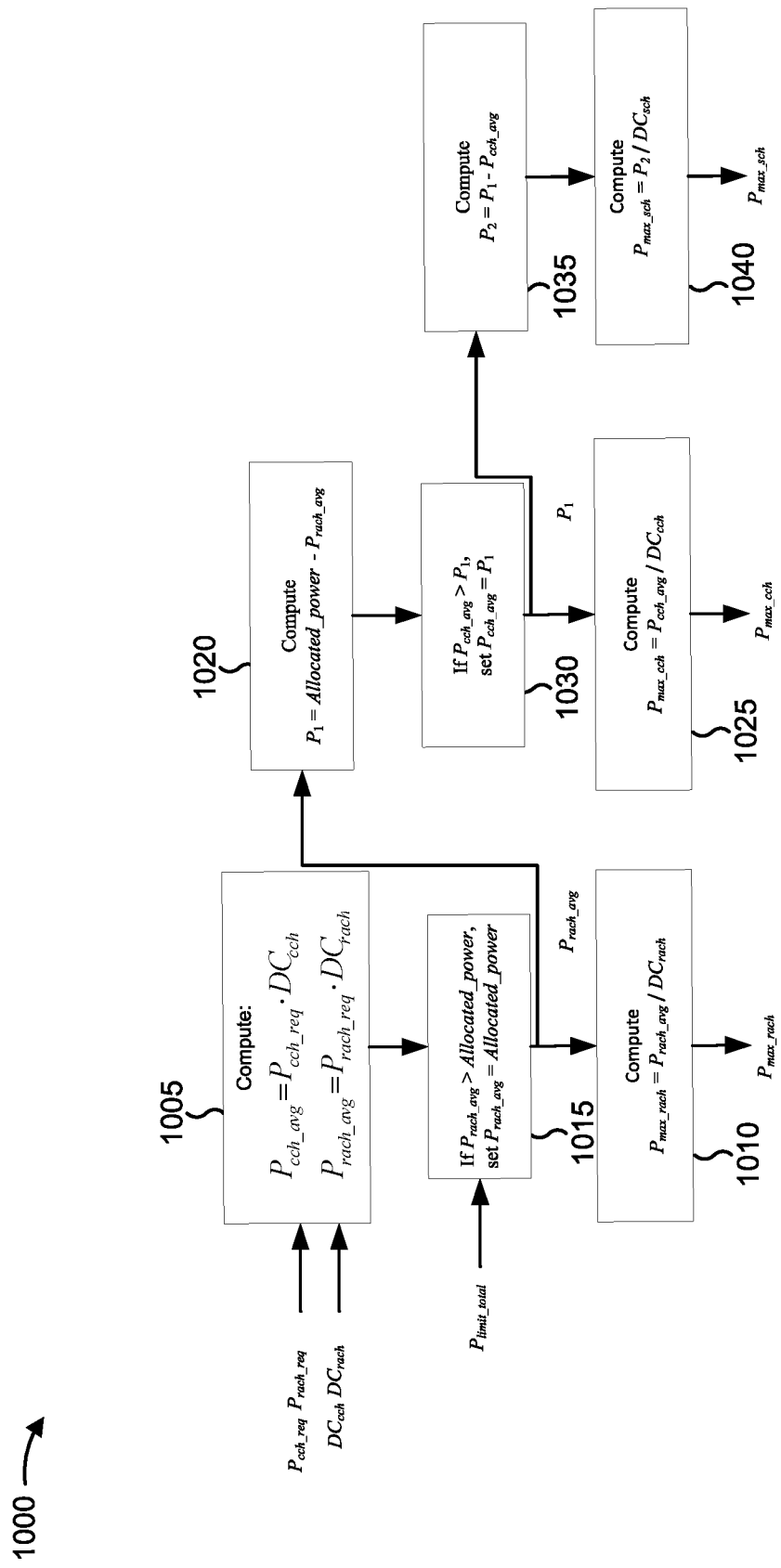
FIG. 10 is a diagram illustrating an example 1000 of determination of a transmission power based on a type of channel, in accordance with the present disclosure.

FIG. 10 is a diagram illustrating an example 1000 of determination of a transmission power based on a type of channel, in accordance with the present disclosure. Criteria for allocating the second amount of power are described below. In some aspects, the criteria may be referred to as second criteria. In some aspects, the operations described with regard to FIG. 10 may be performed by the UE 120 (e.g., using controller/processor 280) for one or more time frames within the time window (e.g., each time frame). The aspects described with respect to FIG. 10 may be used to (dynamically) assign power to channels (or communications within such channel) for a radio based on power allocated to that radio in block 904 of FIG. 9. It will be noted that certain channels are provided herein as an example, but channels or communications other than those explicitly recited herein may similarly be allocated power. Channels herein as described using 5G terminology, but the disclosure is not limited thereto.

In example 1000, the UE may determine an allocated uplink transmission power limit for the future time frame, referred to herein as Allocated_power. Allocated_power may indicate the power allocated to the radio for the time frame, for example, as described above with respect to block 904.

The UE may measure a pathloss, for example, based on one or more reference signals (which may include, for example, a synchronization signal block (SSB), a CSI-RS, a DMRS, a positioning reference signal (PRS), or a phase tracking reference signal (PTRS), a SRS, among other examples), or based on pathloss information reported to the UE by another device. The UE may, based on the measured pathloss, determine one or more instantaneous transmission powers (shown in FIG. 10 as $P_{cch\_req}$ and $P_{rach\_req}$) for the radio to successfully communicate the PUCCH/RACH in the UL. In other words, an instantaneous transmission power such as $P_{cch\_req}$ and $P_{rach\_req}$ may indicate a transmission power at which the UE expects a corresponding channel to be received by the BS, such as with a threshold probability or a threshold block error rate.

As just one example, a UE may determine a required instantaneous transmission power (such as $P_{cch\_req}$ or $P_{rach\_req}$) based on a link budget equation, such as a formula having the form shown below:

$$CINR_{dB} = \left(\frac{P_{xch\_req}}{N_{RB}}\right)_{dB} - (PL)_{dB} - (P_{noise}^{RB})_{dB},$$

where $CINR_{dB}$ is a channel to interference plus noise ratio expressed in decibels (where the subscript dB generally indicates decibels), $(PL)_{dB} = PL_{dist} - G_{gNB} - G_{UE} + L$ is the pathloss including all TX/RX antenna gains and cable losses between UE and gNB, $(P_{noise}^{RB})_{dB} = -1710 + 10 \cdot \log_{10}(12 \cdot \Delta f \cdot 10^3) + (NF)_{dB}$ is the noise power per resource block (RB), and Δf is the subcarrier spacing in KHz, $(NF)_{dB}$ is the gNB (e.g., BS 110) receiver noise figure, and $N_{RB}$ is the number of RBs in frequency domain used per symbol.

The desired $P_{cch\_req}$ and $P_{rach\_req}$ can be expressed by formulas having the form $(P_{cch\_req})_{dB} = CINR_{dB}^{target\_cch} + (N_{RB})_{dB} + (PL)_{dB} + (P_{noise}^{RB})_{dB}$ and $(P_{rach\_req})_{dB} = CINR_{dB}^{target\_rach} + (N_{RB})_{dB} + (PL)_{dB} + (P_{noise}^{RB})_{dB}$.

A channel type or a communication may be associated with a transmission duty cycle (sometimes referred to as an estimated duty cycle). The transmission duty cycle can be configured (e.g., via control signaling), can be preconfigured (e.g., predetermined, configured by an original equipment manufacturer or servicer of the UE, or the like), can be determined (e.g., estimated) by the UE, or the like. A transmission duty cycle may be determined based on network grants, such as based on a number of network grants received in an interval of time. A transmission duty cycle may be specific to a type of channel. For example, a control channel may be associated with a transmission duty cycle (e.g., $DC_{cch}$), a random access channel may be associated with a transmission duty cycle (e.g., $DC_{rach}$), and a shared channel may be associated with a transmission duty cycle (e.g., $DC_{sch}$). In some aspects, a duty cycle may be used for a particular type of communication, such as a voice communication, a data communication, or the like. The transmission duty cycles for two types of channels can be different from each other or can be equal to each other. A transmission duty cycle can be a percent value, a ratio, or the like. For a given channel type, the UE may use a corresponding transmission duty cycle to determine an average transmission power in the time frame. The determination of the average transmission power in the time frame is shown by reference number 1005. For example, an average transmission power is shown by $P_{cch\_avg}$ for a control channel and $P_{rach\_avg}$ for a random access channel (RACH). In some aspects, the UE may determine average transmission powers for multiple types of channels, such as for each type of channel to be transmitted in the time frame or each type of channel that can be transmitted by the UE, for example over a certain period of time. "Channel type" is used interchangeably with "type of channel" herein.

In some aspects, the UE may set or use a channel transmission priority. A channel transmission priority may indicate whether power for one type of channel is to be prioritized over power for another type of channel. As just one example, a channel transmission priority may indicate (for example) that a RACH has a highest priority (indicating that a largest portion of the UE's available transmission power should be allocated to the RACH, or that allocation of available transmission power should first prioritize the RACH), a PUCCH has a second-highest priority, and a PUSCH has a lowest priority. The UE may allocate the average transmission power of a highest-priority channel (if available average power is sufficient to satisfy the average transmission power) to the highest-priority channel, then may allocate an average transmission power of a second-highest-priority channel (if available average power is sufficient to satisfy the average transmission power) to the second-highest-priority channel, and so on, until all types of channels are allocated power and/or the UE has allocated all available average power of the UE. In some aspects, the priorities of the channels may vary between radios.

After the average transmission powers for all channel types are allocated, the UE may determine final instantaneous transmission power limits of the channels for the specific radio of interest based on the channels' allocated average transmission powers and the channels' corresponding duty cycles. In this way, the UE may determine transmission powers that comply with time-averaged power limitations such as may be imposed by regulatory bodies. The UE may provide information indicating the final instantaneous transmission power limits for the types of channels to a transmit component of the UE, such as a transmit automatic gain control (AGC) component, and the transmit component may determine actual transmission powers that satisfy regulatory limits. A transmit AGC component is a component that performs signal amplitude control for an amplifier or a chain of amplifiers, such as may be included in a radio frequency chain of a UE.

For example, as shown by reference number 1010, the UE may allocate a final instantaneous transmission power $P_{max\_rach}$ for a certain radio to a highest-priority channel (a physical random access channel (PRACH) in example 1000) based on an average transmission power of the highest-priority channel (e.g., $P_{rach\_avg}$) and the transmission duty cycle associated with the highest-priority channel (e.g., $DC_{rach}$). As shown by reference number 1015, if the average transmission power of a channel exceeds the allocated power limit Allocated_power, then the UE may set the average transmission power $P_{rach\_avg}$ to Allocated_power, thereby ensuring that regulatory limits are complied with.

As shown by reference number 1020, the UE may determine $P_1$ based on $P_{rach\_avg}$. $P_1$ may indicate available average power after power has been allocated to the PRACH in connection with reference number 1010. As shown by reference number 1025, the UE may allocate a final instantaneous transmission power $P_{max\_cch}$ to a second-highest-priority channel (a control channel in example 1000) based on an average transmission power of the second-highest-priority channel (e.g., $P_{cch\_avg}$) and the transmission duty cycle associated with the second-highest-priority channel (e.g., $DC_{cch}$). As shown by reference number 1030, if the average transmission power of a channel exceeds the available average power after allocating power to higher-priority channel(s) (e.g., $P_1$), then the UE may set the average transmission power $P_{cch\_avg}$ to $P_1$, thereby ensuring that regulatory limits are complied with.

As shown by reference number 1035, the UE may determine $P_2$ based on $P_{cch\_avg}$. $P_2$ indicates available average power after power has been allocated to the PRACH and the PUCCH in connection with reference number 1010. More generally, $P_N$ indicates available average power after power has been allocated to channels associated with priority levels 0 through N−1, where a lower value of N corresponds to a higher priority level (e.g., a channel or communication to receive more power). As shown by reference number 1040, the UE may allocate a final instantaneous transmission power $P_{max\_sch}$ to a third-highest-priority channel (a shared channel in example 1000) based on the remaining average power (e.g., $P_2$) and the transmission duty cycle associated with the third-highest-priority channel (e.g., $DC_{sch}$). The process described with regard to example 1000 can be applied for any number of channels. Furthermore, the process described with regard to example 1000 can be applied for channels (e.g., a data channel, a control channel, a RACH), signals (e.g., reference signals), or a combination of channels and signals.

In some aspects, the UE may determine a final instantaneous transmission power (e.g., $P_{max}$) to be transmitted from a certain radio during a time period of a time frame based on a retransmission. For example, a radio access technology may provide a mechanism for retransmitting a communication that is not successfully received. The retransmission may be based on a feedback mechanism, such as a HARQ feedback mechanism. Considering the downlink, the UE may provide an acknowledgment (ACK) or a negative ACK (NACK) regarding a downlink communication. The UE may provide the ACK/NACK on a control channel or a shared channel (e.g., a PUCCH or a PUSCH). If the BS does not receive the ACK/NACK, the BS may retransmit the downlink communication. In a scenario where power for a control channel transmission is limited, for example due to a time-averaged power limit (e.g., associated with SAR, PD, or the like), the number of retransmissions received by the UE may enable the UE to determine whether ACK/NACKs are being received by the BS. For example, if the UE's transmit power is insufficient for a control channel, the UE may receive an increased number of retransmissions (e.g., even for acknowledged communications) since the BS may fail to receive a number of ACK/NACKs. In some aspects, a time frame may include multiple time periods. In some aspects, a time frame may include a single time period. In some aspects, a time period may be based on a time interval associated with a radio access technology, such as an NR frame length, a subframe length, a slot length, a symbol length, or the like. In some aspects, a length of a time period may be determined by the UE, such as based on preconfiguration, configuration, conditions at the UE, or the like.

The UE 120 may determine a final instantaneous transmission power for a channel (such as a control channel or a shared channel that may carry an ACK/NACK) to be transmitted from a certain radio during a time period of a time frame based on a number of retransmissions received by the UE. For example, the number of retransmissions received by the UE may be determined based on a time frame. The UE may adjust an instantaneous transmission power based on a factor determined based on the number of retransmissions. For example, the factor may be configured for the UE, may be preconfigured, and/or the like. In some aspects, the UE may increase the final instantaneous transmission power based on a larger number of retransmissions, and may decrease the final instantaneous transmission power based on a smaller number of retransmissions (e.g., smaller than the larger number, smaller than a threshold). Thus, the UE may improve reliability of HARQ feedback, thereby improving utilization of network resources.

Considering the uplink, the UE may receive, from a BS, an uplink grant for a retransmission if an uplink transmission of the UE (e.g., a PUSCH) is unsuccessfully received by the BS (e.g., fails to pass a cyclic redundancy check). In a scenario where power for a shared channel transmission is limited, for example due to a time-averaged power limit (e.g., associated with SAR, PD, or the like), the number of uplink grants for retransmissions received by the UE may enable the UE to determine whether PDSCHs are being received by the BS. For example, if the UE's transmit power is insufficient for a shared channel, the UE may receive an increased number of uplink grants for retransmissions.

The UE 120 may determine a final instantaneous transmission power for a channel (such as an uplink shared channel) to be transmitted from a certain radio during a time period of a time frame based on a number of uplink grants for retransmissions received by the UE. For example, the number of uplink grants for retransmissions received by the UE may be determined based on a time frame. For example, the UE may dynamically determine an adjustment or a priority level for a PUSCH final instantaneous transmission power based on a threshold duration. The UE may adjust an instantaneous transmission power based on a factor determined based on the number of uplink grants for retransmissions. For example, the factor may be configured for the UE, may be preconfigured, and/or the like. In some aspects, the UE may increase the final instantaneous transmission power based on a larger number of uplink grants for retransmissions, or may decrease the final instantaneous transmission power based on a smaller number of uplink grants for retransmissions (e.g., smaller than the larger number, smaller than a threshold). Thus, the UE may improve reliability of uplink transmissions, thereby improving utilization of network resources. In some aspects, the UE may switch between prioritizing a first type of channel (e.g., a PUSCH) and a second type of channel (e.g., a PUCCH) so that an ongoing call can be maintained while providing suitable throughput for uplink traffic.

In some aspects, the UE may modify a transmission configuration for a channel in order to increase or decrease a transmission power of the channel. For example, the UE may modify the transmission configuration so that the channel satisfies a final instantaneous transmission power. In some aspects, the transmission configuration may indicate a polarization of the channel. For example, some channels (e.g., a RACH message 1, a RACH message 3, a RACH message A of a two-step RACH procedure, or the like) may be transmitted using both horizontal and vertical polarizations, for example from one or more of the antennas 252. If the UE is to decrease a transmission power for such a channel (e.g., based on a final instantaneous transmission power as described elsewhere herein), the UE may switch from transmitting the channel on both polarizations to transmitting the channel on a single polarization and/or may reduce the number of antennas or antenna elements being used for the transmission. If the UE is to increase a transmission power for such a channel (e.g., based on a final instantaneous transmission power as described elsewhere herein), the UE may switch from transmitting the channel on a single polarization to transmitting the channel on two polarizations and/or may increase the number of antennas or antenna elements being used for the transmission.

In this way, separate power limits of different channels may be allocated to higher priority channels (such as mission critical channels) so that a UE's communication link can still be maintained even if the system is power limited due to regulatory limitations (e.g., SAR or PD limitations). For example, if the uplink is SAR limited and cannot utilize much power, a specific amount of power can be allocated to higher priority channels (e.g., the PUCCH and the RACH) such that the link can still be maintained.

In some embodiments, the initial power allocated to the radio at block 904 (FIG. 9) may be enough power for communication of essential signaling (e.g., sufficient to maintain a link) in a worst case scenario or in other poor or challenging conditions, and may thus increase the likelihood that a device is able to communicate properly in diverse scenarios. Rather than transmitting at the initial power (e.g., first amount) determined at block 904, however, the UE may transmit at the power determined in block 906 (for example as described above with respect to FIG. 10), which may be less than the initial power because the UE may determine (for example based on pathloss and/or other information) that conditions do not necessitate transmitting at a power as high as the initially allocated power. In such circumstance, the operations described above with respect to block 906 and/or FIG. 10 may result in the excess power (e.g., the power difference between the initially allocated power and the determined transmit power) being distributed to one or more other channels or communications. In this way, while a radio is allocated enough transmission power to communicate effectively on a link, the actual or instantaneous transmit power which is utilized can be effectively distributed among one or more channels or communications for a particular radio. The UE may perform such operations periodically (for example, one or more times within a time window associated with a regulatory rule), and thus may dynamically allocate power among transmit channels while ensuring that communication on high priority channels is maintained.

As indicated above, FIG. 10 is provided as an example. Other examples of allocating power to certain channels or communications from a radio may differ from what is described with regard to FIG. 10.

In some embodiments, additional hierarchies may be used instead or in addition to the example illustrated in FIG. 10. For example, any power left over after performing the power allocation described in FIG. 10 may be distributed (in block 906) among other channels or types of communications utilized by the radio, for example pursuant to a user's operation of the UE. In some embodiments, any power remaining for a radio is assigned first to voice and then to data, or another prioritization (such as for specific radio bearers (signaling radio bearer (SRB) vs data radio bearer (DRB)), etc.) is utilized to further allocate any remaining transmit power (e.g., a fourth amount) in accordance with one or more fourth criteria (such as prioritizing first voice then data, or prioritizing specific radio bearers). For example, the fourth amount of transmit power may be allocated from power remaining for allocation in a time window and/or time frame after a second amount of power has been allocated. The fourth amount of power may be allocated to a radio for the time frame based on the fourth criteria. In some embodiments, data or communications on a certain channel may be prioritized over other data or communications on the channel. In some embodiments, data or communications associated with a first application may be prioritized over data or communications associated with a second application. For example, data or communications associated with a video calling app or a streaming video application may be prioritized over data or communications associated with a mail or social media application. As another example, data or communications associated with a video calling, streaming video, or financial application may be associated with a highest priority, data or communications associated with a mail or social media application may be associated with an intermediate priority, and data or communications associated with a messaging application may be associated with a lowest priority. Applications may be prioritized by a user, based on past usage, according to information or instructions from an operating system, etc. In some embodiments, data or communications may be prioritized based on a user associated with the data or communications. For example, data or communications associated with a first user may be prioritized over data or communications associated with a second user. In some embodiments, data or communications may be prioritized based on historical data transfer amounts. For example, data or communications associated with historically larger data transfers may be prioritized over data or communications associated with historically smaller data transfers.

During the time window, transmissions may be communicated by the UE based on the powers calculated/allocated during the block 906. In this way, each radio may be able to comply with RF exposure requirements while maintaining a connection or link and further (dynamically) allocating power among discretionary communications. A discretionary communication is a communication that is not associated with maintaining a connection or link of the UE. For example, a discretionary communication may include a discretionary voice communication, some discretionary data communications, application-based communications, or the like. A communication associated with maintaining a connection or link of the UE may be referred to herein as an essential communication, and may include a physical uplink control channel, a sounding reference signal, a random access channel, some data communications, or the like.

The techniques described herein may be used for various wireless communication technologies, such as NR (e.g., 5G NR), LTE, LTE-Advanced (LTE-A), CDMA, time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), E-UTRA, Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), DU, carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered MTC devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope thereof. In other words, unless a specific order of steps or actions is specified, the order and/or use of specific steps and/or actions may be modified without departing from the scope thereof and any claims based thereon.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the description. Moreover, nothing disclosed herein is intended to be dedicated to the public. The phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The following provides an overview of some Aspects of the present disclosure:

Aspect 1: A method of wireless communication performed by a wireless device, comprising: allocating a first amount of power to one or more radios of the wireless device for a time window based on radio frequency (RF) exposure information and one or more other criteria; allocating a second amount of power to a selected channel or communication utilized by at least one radio of the one or more radios for one or more time frames within the time window based on the first amount of power allocated to the at least one radio for the time window; and transmitting the selected channel or communication based on the first amount of power or the second amount of power.

Aspect 2: The method of Aspect 1, wherein the RF exposure information comprises a time-averaged power.

Aspect 3: The method of any of Aspects 1-2, wherein the one or more other criteria are based on communications associated with maintaining a link associated with the one or more radios.

Aspect 4: The method of Aspect 3, further comprising allocating a third amount of power to the one or more radios for the time window based on there being power available for transmission after allocating the first amount of power.

Aspect 5: The method of Aspect 4, wherein the third amount of power is allocated such that the power available for transmission is distributed evenly among the one or more radios.

Aspect 6: The method of Aspect 4, wherein the third amount of power is allocated such that the power available for transmission is distributed based on a priority of the one or more radios.

Aspect 7: The method of Aspect 4, wherein the second amount of power is allocated based on the first amount of power and the third amount of power.

Aspect 8: The method of Aspect 4, wherein the third amount of power is allocated based on historical power usage of the one or more radios.

Aspect 9: The method of any of Aspects 1-8, wherein the first amount of power is allocated based on an antenna group to which the one or more radios are coupled.

Aspect 10: The method of any of Aspects 1-9, wherein the second amount of power is allocated based on a channel transmission priority.

Aspect 11: The method of Aspect 10, wherein power in excess of a power required to transmit on a first channel of highest priority is allocated to a second channel.

Aspect 12: The method of Aspect 10, wherein power in excess of a power required to transmit on a set of high priority channels is distributed to discretionary communications.

Aspect 13: The method of any of Aspects 1-12, wherein allocating the first amount of power comprises allocating the first amount of power based on a set of high priority channels including a first control channel associated with a first frequency range and a second control channel associated with a second frequency range different than the first frequency range.

Aspect 14: The method of Aspect 13, wherein, if there is insufficient power to transmit all of the set of high priority channels, the first control channel is prioritized over the second control channel based on the first frequency range and the second frequency range.

Aspect 15: The method of Aspect 14, wherein the second control channel is not transmitted if there is insufficient power to transmit all of the set of high priority channels.

Aspect 16: The method of Aspect 10, wherein discretionary voice communications are prioritized over discretionary data communications.

Aspect 17: The method of any of Aspects 1-16, wherein the second amount of power is allocated based on an application associated with the selected channel or communication.

Aspect 18: The method of any of Aspects 1-17, wherein allocating the first amount of power comprises assigning power to a first radio associated with a first radio access technology (RAT) and not to a second radio associated with a second RAT based on a priority of communications associated with the first and second RATs.

Aspect 19: The method of any of Aspects 1-18, wherein there is one time frame that is commensurate in duration with the time window.

Aspect 20: The method of any of Aspects 1-19, wherein the first amount of power is an amount of power required to transmit on a set of channels.

Aspect 21: The method of Aspect 20, wherein the first amount of power is based on a network configuration associated with the set of channels.

Aspect 22: The method of Aspect 21, wherein the first amount of power is based on a duty cycle associated with a first type of channel of the set of channels and the second amount of power is based on a duty cycle associated with a second type of channel.

Aspect 23: The method of any of Aspects 1-22, wherein the first amount of power is based on an amount of power to transmit one or more essential channels and an amount of power to transmit a voice communication.

Aspect 24: The method of Aspect 23, wherein the first amount of power includes a margin in addition to the amount of power to transmit the one or more essential channels and the amount of power to transmit the voice communication.

Aspect 25: The method of any of Aspects 1-24, wherein the time window includes a plurality of time frames, the second amount of power is a variable amount of transmit power that is allocated to the selected channel or communication for each of the plurality of time frames, and the second amount of power is compliant with the first amount of power and a third amount of power allocated to the one or more radios throughout the time window.

Aspect 26: The method of Aspect 25, wherein the variable amount of transmit power is allocated based on a pathloss or an estimated duty cycle.

Aspect 27: The method of any of Aspects 1-26, wherein the wireless device comprises a user equipment.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The various operations of methods described above may be performed by any suitable means capable of performing the corresponding functions. The means may include various hardware and/or software component(s) and/or module(s), including, but not limited to a circuit, an ASIC, or processor. Generally, where there are operations illustrated in figures, those operations may have corresponding counterpart means-plus-function components with similar numbering. Further, while examples are described above with respect to operations of a UE, the operations, functions, etc. described herein may be performed by any wireless device.

The various illustrative logical blocks, modules and circuits described in connection with the present disclosure may be implemented or performed with a general purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (TR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5, 9, and/or 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that any claims based on this description are not limited to the precise configuration and components illustrated above. Various modifications, changes, and variations may be made in the arrangement, operation, and details of the methods and apparatus described above without departing from the scope of the claims.

What is claimed is:

1. A method of wireless communication performed by a wireless device, comprising:
    allocating a first amount of power to a plurality of radios of the wireless device for a time window based on radio frequency (RF) exposure information and one or more other criteria;
    allocating, from at least the first amount of power allocated to at least one radio of the plurality of radios for the time window, a second amount of power to a selected channel or communication to be transmitted by the at least one radio for one or more time frames within the time window,
        wherein the first amount of power is different from the second amount of power,
        wherein the second amount of power is allocated based on a channel transmission priority, and
        wherein power in excess of a power required to transmit on a set of high priority channels is distributed to discretionary communications;
    and transmitting the selected channel or communication based on the second amount of power.

2. The method of claim 1, wherein the RF exposure information comprises a time-averaged power.

3. The method of claim 1, wherein the one or more other criteria are based on a minimum quantity or type of communications associated with maintaining a link associated with the plurality of radios.

4. The method of claim 1, further comprising allocating a third amount of power to one or more radios of the plurality of radios for the time window based on there being power available for transmission after allocating the first amount of power.

5. The method of claim 4, wherein the third amount of power is allocated such that the power available for transmission is distributed evenly among the one or more radios.

6. The method of claim 4, wherein the third amount of power is allocated such that the power available for transmission is distributed based on a priority of the one or more radios.

7. The method of claim 4, wherein the second amount of power is allocated from the first amount of power and the third amount of power.

8. The method of claim 4, wherein the third amount of power is allocated based on historical power usage of the one or more radios.

9. The method of claim 1, wherein the first amount of power is allocated based on an antenna group to which the plurality of radios are coupled.

10. The method of claim 1, wherein allocating the first amount of power comprises allocating the first amount of power based on the set of high priority channels including a first control channel associated with a first frequency range and a second control channel associated with a second frequency range different than the first frequency range.

11. The method of claim 10, wherein, if there is insufficient power to transmit all of the set of high priority channels, the first control channel is prioritized over the second control channel based on the first frequency range and the second frequency range.

12. The method of claim 11, wherein the second control channel is not transmitted if there is insufficient power to transmit all of the set of high priority channels.

13. The method of claim 1, wherein discretionary voice communications are prioritized over discretionary data communications.

14. The method of claim 1, wherein the second amount of power is allocated based on an application associated with the selected channel or communication.

15. The method of claim 1, wherein allocating the first amount of power comprises assigning power to a first radio associated with a first radio access technology (RAT) and not to a second radio associated with a second RAT based on a priority of communications associated with the first and second RATs.

16. The method of claim 1, wherein there is one time frame that is commensurate in duration with the time window.

17. The method of claim 1, wherein the first amount of power is an amount of power required to transmit on a set of channels.

18. The method of claim 17, wherein the first amount of power is based on a network configuration associated with the set of channels.

19. The method of claim 18, wherein the first amount of power is based on a duty cycle associated with a first type of channel of the set of channels and the second amount of power is based on a duty cycle associated with a second type of channel.

20. The method of claim 1, wherein the first amount of power is based on an amount of power to transmit one or more essential channels and an amount of power to transmit a voice communication.

21. The method of claim 20, wherein the first amount of power includes a margin in addition to the amount of power to transmit the one or more essential channels and the amount of power to transmit the voice communication.

22. The method of claim 1, wherein the time window includes a plurality of time frames, the second amount of power is a variable amount of transmit power that is allocated to the selected channel or communication for each of the plurality of time frames, and the second amount of power is compliant with the first amount of power and a third amount of power allocated to the plurality of radios throughout the time window.

23. The method of claim 22, wherein the variable amount of transmit power is allocated based on a pathloss or an estimated duty cycle.

24. The method of claim 1, wherein the wireless device comprises a user equipment.

25. The method of claim 1, wherein:
a first one or more radios of the plurality of radios correspond to a first set of bands; and
a second one or more radios of the plurality of radios correspond to a second set of bands.

26. The method of claim 1, wherein:
a first one or more radios of the plurality of radios are cellular radios; and a second one or more radios of the plurality of radios are wireless local area network (WLAN) or Bluetooth radios.

27. A user equipment (UE) for wireless communication, comprising:
one or more memories; and
one or more processors coupled to the one or more memories, the one or more memories and the one or more processors configured to:
allocate a first amount of power to a plurality of radios for a time window based on radio frequency (RF) exposure information and one or more other criteria;
allocate, from at least the first amount of power allocated to at least one radio of the plurality of radios for the time window, a second amount of power to a selected channel or communication to be transmitted by the at least one radio for one or more time frames within the time window,
wherein the first amount of power is different from the second amount of power,
wherein the second amount of power is allocated based on a channel transmission priority, and
wherein power in excess of a power required to transmit on a set of high priority channels is distributed to discretionary communications; and
transmit the selected channel or communication based on the second amount of power.

28. The UE of claim 27, wherein the RF exposure information comprises a time-averaged power.

29. A non-transitory computer-readable medium storing one or more instructions for wireless communication, the one or more instructions comprising:
one or more instructions that, when executed by one or more processors of a user equipment, cause the one or more processors to:
allocate a first amount of power to a plurality of radios of the user equipment for a time window based on radio frequency (RF) exposure information and one or more other criteria;
allocate, from at least the first amount of power allocated to at least one radio of the plurality of radios for the time window, a second amount of power to a selected channel or communication to be transmitted by the at least one radio for one or more time frames within the time window,
wherein the first amount of power is different from the second amount of power,
wherein the second amount of power is allocated based on a channel transmission priority, and
wherein power in excess of a power required to transmit on a set of high priority channels is distributed to discretionary communications; and
transmit the selected channel or communication based on the amount of power.

30. An apparatus for wireless communication, comprising:
means for allocating a first amount of power to a plurality of radios of a device including the apparatus for a time window based on radio frequency (RF) exposure information and one or more other criteria;
means for allocating, from at least the first amount of power allocated to at least one radio of the plurality of radios for the time window, a second amount of power to a selected channel or communication to be transmitted by the at least one radio for one or more time frames within the time window, wherein the first amount of power is different from the second amount of power, wherein the second amount of power is allocated based on a channel transmission priority, and wherein power in excess of a power required to transmit on a set of high priority channels is distributed to discretionary communications;

and means for transmitting the selected channel or communication based on the second amount of power.

* * * * *